United States Patent
Kim et al.

(10) Patent No.: US 10,155,830 B2
(45) Date of Patent: Dec. 18, 2018

(54) ETHYLENE/ALPHA-OLEFIN COPOLYMERS HAVING EXCELLENT PROCESSABILITY

(71) Applicant: LG CHEM, LTD., Seoul (KR)

(72) Inventors: Joong Soo Kim, Daejeon (KR); Soon Ho Sun, Daejeon (KR); Oh Joo Kwon, Daejeon (KR); Yi Young Choi, Daejeon (KR); Ki Soo Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 267 days.

(21) Appl. No.: 15/106,708

(22) PCT Filed: Dec. 7, 2015

(86) PCT No.: PCT/KR2015/013328
§ 371 (c)(1),
(2) Date: Jun. 20, 2016

(87) PCT Pub. No.: WO2016/093580
PCT Pub. Date: Jun. 16, 2016

(65) Prior Publication Data
US 2018/0194883 A1  Jul. 12, 2018

(30) Foreign Application Priority Data

Dec. 8, 2014 (KR) .......... 10-2014-0174985
Nov. 17, 2015 (KR) .......... 10-2015-0161159

(51) Int. Cl.
*C08L 23/08* (2006.01)
*C08F 4/6592* (2006.01)
*C08F 210/16* (2006.01)
*C08F 4/659* (2006.01)

(52) U.S. Cl.
CPC .......... *C08F 210/16* (2013.01); *C08F 4/6592* (2013.01); *C08L 23/0815* (2013.01); *C08F 4/65904* (2013.01); *C08F 4/65908* (2013.01); *C08F 4/65912* (2013.01); *C08F 4/65916* (2013.01); *C08F 4/65925* (2013.01); *C08F 4/65927* (2013.01); *C08F 2420/06* (2013.01)

(58) Field of Classification Search
CPC ............... C08F 210/16; C08F 4/65904; C08F 4/65927; C08L 23/0815
See application file for complete search history.

(56) References Cited

U.S. PATENT DOCUMENTS

| | | | |
|---|---|---|---|
| 4,935,474 A | 6/1990 | Ewen et al. | |
| 5,914,289 A | 6/1999 | Razavi | |
| 6,828,394 B2 | 12/2004 | Vaughan et al. | |
| 6,841,631 B2 | 1/2005 | Loveday et al. | |
| 6,894,128 B2 | 5/2005 | Loveday et al. | |
| 7,806,841 B2 | 10/2010 | Caselnova | |
| 8,097,678 B2 | 1/2012 | Van Marion et al. | |
| 8,153,043 B2 | 4/2012 | Krishnaswamy et al. | |
| 8,785,574 B2 | 7/2014 | Bando et al. | |
| 2004/0077810 A1 | 4/2004 | Marechal | |
| 2009/0246433 A1 | 10/2009 | Michie et al. | |
| 2009/0275711 A1 | 11/2009 | Winslow et al. | |
| 2011/0212283 A1 | 9/2011 | Fantinel et al. | |
| 2014/0213734 A1 | 7/2014 | Jiang | |
| 2016/0237188 A1* | 8/2016 | Hong | C08F 210/16 |
| 2016/0369020 A1* | 12/2016 | Sung | C08F 4/6592 |
| 2017/0044278 A1* | 2/2017 | Lee | C08F 10/14 |

FOREIGN PATENT DOCUMENTS

| | | |
|---|---|---|
| JP | 2008195963 A | 8/2008 |
| JP | 2012503687 A | 2/2012 |
| KR | 10-2004-0076965 A | 9/2004 |
| KR | 10-2005-0024287 A | 3/2005 |
| KR | 10-0613949 B1 | 8/2006 |
| KR | 10-2007-0100294 A | 10/2007 |
| KR | 10-0903600 B1 | 6/2009 |
| KR | 10-2010-0076056 A | 7/2010 |
| KR | 10-1116699 B1 | 3/2012 |
| KR | 10-1166946 B1 | 7/2012 |
| KR | 10-2012-0087706 A | 8/2012 |
| KR | 10-1190297 B1 | 10/2012 |
| KR | 10-1196389 B1 | 11/2012 |
| KR | 10-2013-0046408 A | 5/2013 |
| KR | 10-2013-0113322 A | 10/2013 |
| KR | 10-1382090 B1 | 4/2014 |
| KR | 10-2015-0045369 A | 4/2015 |
| KR | 10-2015-0062004 A | 6/2015 |
| KR | 10-2015-0062924 A | 6/2015 |
| WO | 2015/056975 A1 | 4/2015 |
| WO | 2016/060445 A1 | 4/2016 |

OTHER PUBLICATIONS

Marianna Kontopoulou et al., "Binary Blends of EVA and Metallocene-Catalyzed Ethylene-a-Olefin Copolymers and Their Film Properties", Advances in Polymer Technology, 2003, vol. 22, No. 3, pp. 209-217.

* cited by examiner

*Primary Examiner* — Caixia Lu
(74) *Attorney, Agent, or Firm* — Dentons US LLP

(57) ABSTRACT

The present invention relates to an ethylene/alpha-olefin copolymer having excellent processability. The ethylene/alpha-olefin copolymer according to the present invention has low complex viscosity at high shear rate and has excellent processability, and thus it could be applied to the processing of a large diameter pipe, a complex pipe or the like.

9 Claims, 3 Drawing Sheets

[FIG. 1]
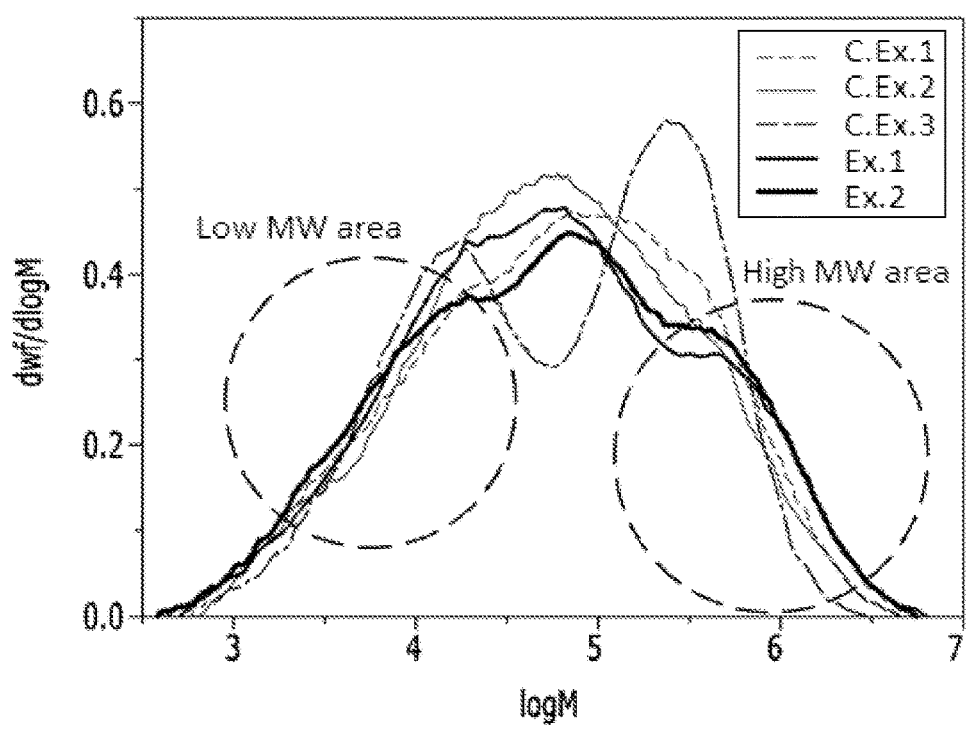

[FIG. 2]
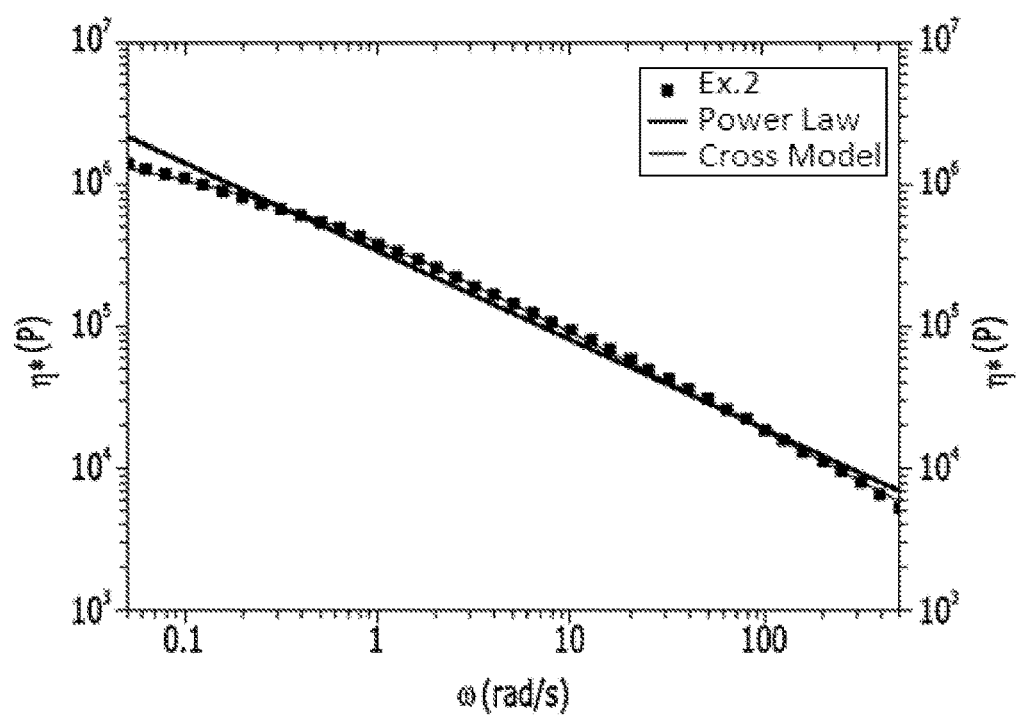

[FIG. 3]
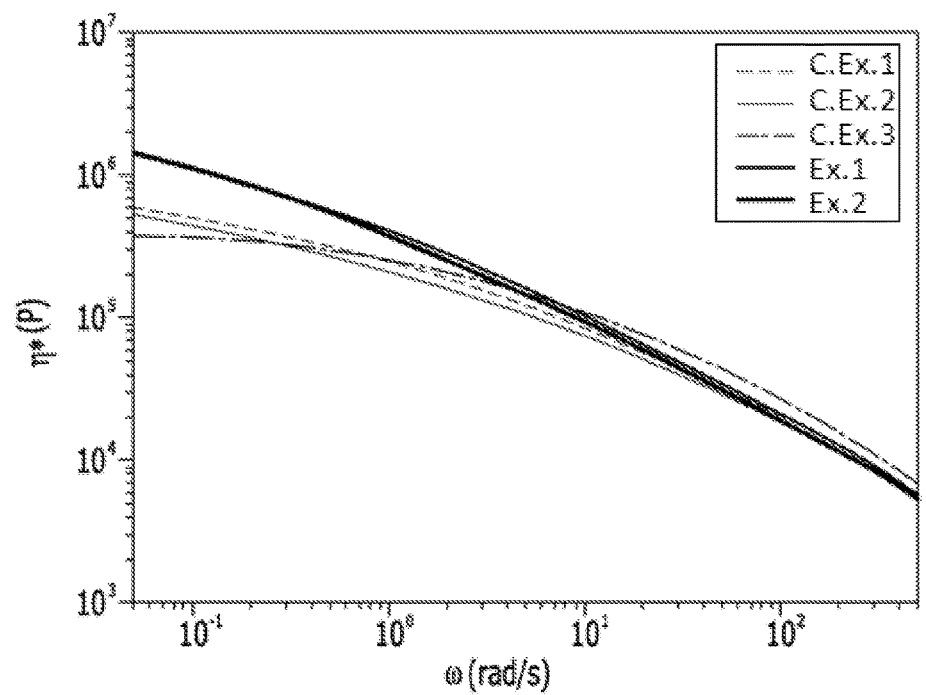

ETHYLENE/ALPHA-OLEFIN COPOLYMERS HAVING EXCELLENT PROCESSABILITY

CROSS-REFERENCE TO RELATED APPLICATION(S)

This application is a National Stage Application of International Application No. PCT/KR2015/013328 filed on Dec. 7, 2015, which claims the benefit of Korean Patent Application No. 10-2014-0174985 filed on Dec. 8, 2014 and Korean Patent Application No. 10-2015-0161159 filed on Nov. 17, 2015, all of which are hereby incorporated by reference in their entirety for all purposes as if fully set forth herein.

TECHNICAL FIELD

The present invention relates to an ethylene/alpha-olefin copolymer having excellent processability.

BACKGROUND OF ART

Olefin polymerization catalyst systems can be classified into Ziegler-Natta and metallocene catalyst systems, and these two highly active catalyst systems have been developed in compliance with their characteristics. Ziegler-Natta catalyst has been widely applied to existing commercial processes since it was developed in the 1950's. However, since the Ziegler-Natta catalyst is a multi-active site catalyst in which a plurality of active sites are mixed, it has a feature that the molecular weight distribution is broad. Also, since a compositional distribution of comonomers is not uniform, there is a problem that it has a limitation to secure the desired physical properties.

Meanwhile, the metallocence catalyst includes a main catalyst whose main component is a transition metal compound, and an organometallic compound cocatalyst whose main component is aluminium. Such a catalyst is a single-site catalyst which is a homogeneous complex catalyst, and offers a polymer having a narrow molecular weight distribution and an uniform composition distribution of comonomers, depending on the single site characteristics. The stereoregularity, copolymerizing properties, molecular weight, crystallinity and the like of the resulting polymer can be controlled by changing the ligand structure of the catalyst and the polymerization condition.

U.S. Pat. No. 5,914,289 discloses a method of controlling the molecular weight and the molecular weight distribution of polymers using metallocene catalysts which are respectively supported on supports. However, a large amount of solvent and a long period of time are required to prepare the supported catalysts, and the process of supporting metallocene catalysts on the respective support is troublesome.

Korean Patent Application No. 10-2003-0012308 discloses a method of controlling the molecular weight distribution of polymers by changing and polymerizing a combination of catalysts in a reactor by supporting a bi-nuclear metallocene catalyst and a mononuclear metallocene catalyst with an activator on a support. However, this method has a limitation to achieve the properties of the respective catalysts simultaneously. In addition, there is a disadvantage that a metallocene catalyst portion is departed from a supported component of the catalyst to cause fouling in the reactor.

Therefore, in order to solve the above-mentioned disadvantages, there is a need to develop a method for preparing olefin based polymers with the desired physical properties by easily preparing a hybrid supported metallocene catalyst having an excellent activity.

On the other hand, a linear low density polyethylene is prepared by copolymerizing ethylene and alpha-olefins using a polymerization catalyst under a low pressure. Thus, this is a resin having a narrow molecular weight distribution which has a certain length of a short chain branch, without a long chain branch. The linear low density polyethylene film has, in addition to the characteristics of a typical polyethylene, high strength and elongation at break, and exhibits excellent tear strength and falling weight impact strength. The use of the linear low density polyethylene film increases in the stretch film, overlapping film or the like which is difficult to apply to existing low density polyethylene or high density polyethylene.

However, the linear low density polyethylene using 1-butene or 1-hexene as a comonomer is mostly prepared in a single gas phase reactor or a single loop slurry reactor, and the productivity is high as compared to a process using 1-octene comonomer, but these products also have limits in the catalyst technology and process technology. Thus, they are problematic in that their physical properties are greatly inferior to when using 1-octene comonomer and the molecular weight distribution is narrow and thus the processability is poor.

Many studies are conducted to improve these problems, and U.S. Pat. No. 4,935,474 discloses a process for producing polyethylenes having a broad molecular weight distribution by using two or more metallocene compounds. U.S. Pat. No. 6,828,394 discloses a process for producing polyethylenes having an excellent processability and particularly suitable for the film by mixing a good comonomer incorporating catalyst compound and a poor comonomer incorporating catalyst compound. In addition, U.S. Pat. No. 6,841,631 and U.S. Pat. No. 6,894,128 disclose that polyethylenes having a bimodal or multimodal molecular weight distribution is prepared by a metallocene-based catalyst comprising at least two metal compounds and thus it can be used for a film, a blow molding, a pipe and the like. However, there are still problems that although the processability of these products was improved, the dispersion state per molecular weight within the unit particle is not uniform and thus the extruded appearance is rough even under a relatively good extrusion condition, and the physical property is not stable.

Given the above circumstances, the preparation of superior products, having a balance between the physical property and the processability is continuously required, and further improvement for this is necessary.

DETAILED DESCRIPTION OF THE INVENTION

Technical Problem

In order to solve the above-mentioned problems, an object of the present invention is to provide an ethylene/alpha-olefin copolymer having an excellent processability.

Technical Solution

In order to achieve the above object, the present invention provides an ethylene/alpha-olefin copolymer which satisfies the following conditions:

the density (g/cm$^3$) is 0.930 to 0.950 g/cm$^3$,

MFR$_5$ (g/10 min, measured at 190° C. in accordance with ASTM 1238) is 0.1 to 5;

a melt flow rate ratio ($MFR_{21.6}/MFR_5$, measured at 190° C. in accordance with ASTM 1238) is 10 to 200; and when a graph of complex viscosity ($\eta^*$[Pa·s]) versus frequency ($\omega$[rad/s]) is fitted to the power law of the following Equation 1, a $C_1$ value is 250,000 to 400,000 and a $C_2$ value is −0.7 to −0.5, and when fitted to the cross model of the following Equation 2, a $C_1$ value is 1,500,000 to 2,500,000, a $C_2$ value is 3 to 10 and a $C_3$ value is 0.2 to 0.3:

$$y = c_1 x^{c_2} \quad \text{[Equation 1]}$$

$$y = \frac{c_1}{1 + (c_2 x)^{(1-c_3)}}. \quad \text{[Equation 2]}$$

In the case of perfectly elastic materials, deformation occurs in proportion to an elastic shear stress, and this is called Hooke's law. Also, in the case of purely viscous liquids, deformation occurs in proportion to a viscous shear stress, and this is called Hooke's law. The perfectly elastic material can again recover the deformation if the elastic shear stress is removed by accumulation of the elastic energy. Also, the perfectly viscose material does not recover the deformation even if the elastic shear stress is removed, because all of energy is dissipated by the deformation. Also, the viscosity of the material itself does not change.

However, a polymer has properties intermediate between properties of the perfectly elastic material and those of the viscose liquid, and this is called viscoelasticity. That is, the polymer has characteristics that, if it receives a shear stress in a molten state, the deformation is not in proportion to the shear stress, and the viscosity is changed according to the shear stress, which is called non-Newtonian fluids. These characteristics are due to the complexity of the deformation caused by the shear stress because the polymer has a huge molecular size and a complex molecular structure.

In particular, when manufacturing a molded article using a polymer, a shear thinning phenomenon among the characteristics of the non-Newtonian fluid is considered important. The shear thinning phenomenon refers to a phenomenon where the viscosity of the polymer decreases as the shear rate increases. The method for molding the polymer is determined according to such shear thinning properties. In particular, when manufacturing a large molded article such as a large diameter pipe or a complex pipe as in the present invention, or a molded article requiring high-speed extrusion of the polymer, considerable pressure must be applied to the molten polymer. Therefore, the preparation of the molded article is difficult unless the polymer exhibits the shear thinning properties. In this regard, the shear thinning properties are considered important.

In the present invention, the shear thinning properties are measured through a graph of complex viscosity ($\eta^*$[Pa·s]) versus frequency ($\omega$[rad/s]).

Equation 1 and Equation 2 are models for quantitatively evaluating the shear thinning properties of the ethylene/alpha-olefin copolymer according to the present invention, and these are to predict the complex viscosity against high frequency by applying the complex viscosity data against the frequency.

First, Equation 1 is a power law model, wherein x means a frequency, y means a complex viscosity, and two variables $C_1$ and $C_2$ are required. $C_1$ refers to a consistency index, $C_2$ refers to a CV index, and $C_2$ value means a gradient of graph.

The higher the complex viscosity at a low frequency, the physical properties are more improved. The lower the complex viscosity at a high frequency, the processability is more improved. Therefore, the smaller the $C_2$ value, that is, the larger the negative gradient in the graph, it is preferable.

Also, Equation 2 is a cross model, wherein x means a frequency, y means a complex viscosity, and three variables $C_1$, $C_2$ and $C_3$ are required. $C_1$ refers to a zero-shear viscosty, $C_2$ refers to a material constant, and $C_3$ refers to a flow behavior index. In particular, the lower the $C_3$ value, that is, the larger the value of negative gradient, the complex viscosity at a high frequency is lowered, thereby exhibiting excellent shear thinning properties.

By the method of fitting a graph of complex viscosity versus frequency to Equations 1 and 2, TA Orchestrator, an ARES-measuring program (TA Instruments), can be used.

Thus, the ethylene/alpha-olefin copolymer according to the present invention is characterized in that, when a graph of complex viscosity versus frequency is fitted to a power law of Equation 1, a $C_2$ value is −0.7 to −0.5, and when fitted to a cross model of Equation 2, a $C_3$ value is 0.2 to 0.3.

Further, the $C_1$ value of Equation 2 refers to a zero-shear viscosity, and has a value ranging from 1,500,000 to 2,500,000. When the $C_1$ value is greater than 2,500,000, the value of zero-shear viscosity is too high and thus, the value of complex viscosity at high frequency appears high. Also, when the $C_1$ value is less than 1,500,000, the value of negative gradient in the graph appears low and thus, the value of complex viscosity at high frequency appears high.

Further, the $C_2$ value of Equation 2 refers to a material constant, and has a value ranging from 3 to 10, preferably from 5 to 8.

Further, the value of complex viscosity at high frequency, that is, at 800 rad/s and 1,200 rad/s can be predicted by substituting the $C_1$, $C_2$ and $C_3$ values thus obtained for Equation 2. Thereby, the shear thinning properties of the ethylene/alpha-olefin copolymer according to the present invention can be predicted.

Specifically, when x in Equation 2 is 800, the value of y is 3,000 to 5,000. More preferably, when x in Equation 2 is 800, the value of y is 4,000 to 4,900, most preferably 4,000 to 4,500.

Also, when x in Equation 2 is 1,200, the value of y is 3,000 to 3,800. More preferably, when x in Equation 2 is 1,200, the value of y is 3,000 to 3,700, most preferably 3,000 to 3,200.

According to one embodiment of the present invention, when x is 800 and 1,200, the value of complex viscosity appeared low. This means that the ethylene/alpha-olefin copolymer according to the present invention has low viscosity at high shear rate, thereby exhibiting significantly excellent processability.

Preferably, the ethylene/alpha-olefin copolymer has a density ($g/cm^3$) of 0.931 or more, 0.932 or more, 0.933 or more, 0.934 or more, 0.935 or more, 0.936 or more, 0.937 or more, 0.938 or more, 0.939 or more, 0.940 or more, 0.941 or more, or 0.942 or more, and of 0.949 or less, 0.948 or less, 0.947 or less, 0.946 or less, or 0.945 or less.

Also preferably, the ethylene/alpha-olefin copolymer has a weight average molecular weight (g/mol) of 10,000 to 400,000. More preferably, the weight average molecular weight is 100,000 or more, 120,000 or more, 140,000 or more, 160,000 or more, 180,000 or more, or 200,000 or more, and is 380,000 or less, 360,000 or less, 340,000 or less, 320,000 or less, 300,000 or less, 280,000 or less, 260,000 or less, or 240,000 or less.

Also preferably, the ethylene/alpha-olefin copolymer has a molecular weight distribution (Mw/Mn, PDI) of 5 to 30. More preferably, the molecular weight distribution is 7 or more, 9 or more, 11 or more, 13 or more, 15 or more, or 17 or more, and is 29 or less, 28 or less, 27 or less, 26 or less, 25 or less, 24 or less, 23 or less, or 22 or less.

The alpha-olefin that can be used for the copolymerization of ethylene/alpha-olefin may include one or more selected from the group consisting of 1-butene, 1-pentene, 1-hexene, 4-methyl-1-pentene, 1-octene, 1-decene, 1-dodecene, 1-tetradecene, 1-hexadecene, 1-octadecene and 1-eicosene. In the ethylene/alpha-olefin copolymer, the content of the alpha-olefin may be about 0.5 to about 10% by weight, preferably about 1 to about 5% by weight, but is not limited thereto.

The above-described ethylene/alpha-olefin copolymer can be prepared by using a metallocene catalyst. The metallocene catalyst that can be used herein may be mixtures of one or more first metallocene compounds represented by the following Chemical Formula 1; and one or more second metallocene compounds selected among the compounds represented by the following Chemical Formulae 3 to 5:

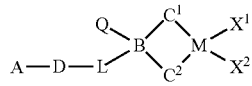

[Chemical Formula 1]

in Chemical Formula 1,

A is hydrogen, halogen, $C_1$-$C_{20}$ alkyl, $C_2$-$C_{20}$ alkenyl, $C_6$-$C_{20}$ aryl, $C_7$-$C_{20}$ alkylaryl, $C_7$-$C_{20}$ arylalkyl, $C_1$-$C_{20}$ alkoxy, $C_2$-$C_{20}$ alkoxyalkyl, $C_3$-$C_{20}$ heterocycloalkyl, or $C_5$-$C_{20}$ heteroaryl;

D is —O—, —S—, —N(R)—, or —Si(R)(R')—, wherein R and R' are the same as or different from each other and each independently hydrogen, halogen, $C_1$-$C_{20}$ alkyl, $C_2$-$C_{20}$ alkenyl, or $C_6$-$C_{20}$ aryl;

L is $C_1$-$C_{10}$ linear or branched alkylene;

B is carbon, silicon, or germanium;

Q is hydrogen, halogen, $C_1$-$C_{20}$ alkyl, $C_2$-$C_{20}$ alkenyl, $C_6$-$C_{20}$ aryl, $C_7$-$C_{20}$ alkylaryl, or $C_7$-$C_{20}$ arylalkyl;

M is a Group 4 transition metal;

$X^1$ and $X^2$ are the same as or different from each other and each independently halogen, $C_1$-$C_{20}$ alkyl, $C_2$-$C_{20}$ alkenyl, $C_6$-$C_{20}$ aryl, nitro, amido, $C_1$-$C_{20}$ alkylsilyl, $C_1$-$C_{20}$ alkoxy, or $C_1$-$C_{20}$ sulfonate;

$C^1$ and $C^2$ are the same as or different from each other and each independently represented by any one of the following Chemical Formula 2a, Chemical Formula 2b or Chemical Formula 2c, provided that both of $C^1$ and $C^2$ are not represented by the following Chemical Formula 2c:

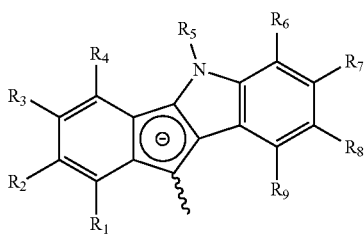

[Chemical Formula 2a]

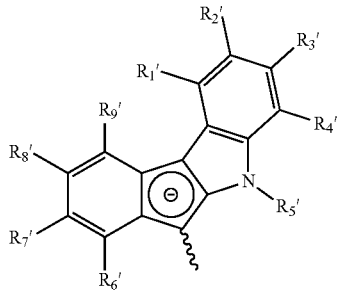

[Chemical Formula 2b]

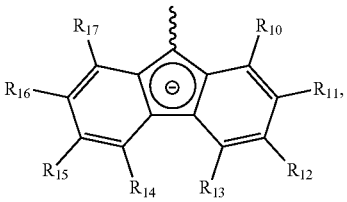

[Chemical Formula 2c]

in Chemical Formulae 2a, 2b and 2c, $R_1$ to $R_{17}$ and $R_1'$ to $R_9'$ are the same as or different from each other and each independently hydrogen, halogen, $C_1$-$C_{20}$ alkyl, $C_2$-$C_{20}$ alkenyl, $C_1$-$C_{20}$ alkylsilyl, $C_1$-$C_{20}$ silylalkyl, $C_1$-$C_{20}$ alkoxysilyl, $C_1$-$C_{20}$ alkoxy, $C_6$-$C_{20}$ aryl, $C_7$-$C_{20}$ alkylaryl, or $C_7$-$C_{20}$ arylalkyl, wherein two or more adjacent groups among $R_{10}$ to $R_{17}$ may be connected together to form substituted or unsubstituted aliphatic or aromatic ring;

$(Cp^1R^a)_n(Cp^2R^b)M^1Z^1_{3-n}$      [Chemical Formula 3]

in Chemical Formula 3, $M^1$ is a Group 4 transition metal;

$Cp^1$ and $Cp^2$ are the same as or different from each other, and each independently any one selected from the group consisting of cyclopentadienyl, indenyl, 4,5,6,7-tetrahydro-1-indenyl, and fluorenyl radical, each of which may be substituted by hydrocarbon having 1 to 20 carbon atoms;

$R^a$ and $R^b$ are the same as or different from each other, and each independently hydrogen, $C_1$-$C_{20}$ alkyl, $C_1$-$C_{10}$ alkoxy, $C_2$-$C_{20}$ alkoxyalkyl, $C_6$-$C_{20}$ aryl, $C_6$-$C_{10}$ aryloxy, $C_2$-$C_{20}$ alkenyl, $C_7$-$C_{40}$ alkylaryl, $C_7$-$C_{40}$ arylalkyl, $C_8$-$C_{40}$ arylalkenyl, or $C_2$-$C_{10}$ alkynyl;

$Z^1$ is halogen atom, $C_1$-$C_{20}$ alkyl, $C_2$-$C_{10}$ alkenyl, $C_7$-$C_{40}$ alkylaryl, $C_7$-$C_{40}$ arylalkyl, $C_6$-$C_{20}$ aryl, substituted or unsubstituted $C_1$-$C_{20}$ alkylidene, substituted or unsubstituted amino, $C_2$-$C_{20}$ alkylalkoxy, or $C_7$-$C_{40}$ arylalkoxy; and n is 1 or 0;

$(Cp^3R^c)_mB^1(Cp^4R^d)M^2Z^2_{3-m}$      [Chemical Formula 4]

in Chemical Formula 4, $M^2$ is a Group 4 transition metal;

$Cp^3$ and $Cp^4$ are the same as or different from each other, and each independently any one selected from the group consisting of cyclopentadienyl, indenyl, 4,5,6,7-tetrahydro-1-indenyl and fluorenyl radical, each of which may be substituted by hydrocarbon having 1 to 20 carbon atoms;

$R^c$ and $R^d$ are the same as or different from each other, and each independently hydrogen, $C_1$-$C_{20}$ alkyl, $C_1$-$C_{10}$ alkoxy, $C_2$-$C_{20}$ alkoxyalkyl, $C_6$-$C_{20}$ aryl, $C_6$-$C_{10}$ aryloxy, $C_2$-$C_{20}$ alkenyl, $C_7$-$C_{40}$ alkylaryl, $C_7$-$C_{40}$ arylalkyl, $C_8$-$C_{40}$ arylalkenyl, or $C_2$-$C_{10}$ alkynyl;

$Z^2$ is halogen atom, $C_1$-$C_{20}$ alkyl, $C_2$-$C_{10}$ alkenyl, $C_7$-$C_{40}$ alkylaryl, $C_7$-$C_{40}$ arylalkyl, $C_6$-$C_{20}$ aryl, substituted or unsubstituted $C_1$-$C_{20}$ alkylidene, substituted or unsubstituted amino group, $C_2$-$C_{20}$ alkylalkoxy, or $C_7$-$C_{40}$ arylalkoxy;

$B^1$ is one or more selected from the radicals containing carbon, germanium, silicon, phosphorous or nitrogen atom, which crosslink $Cp^3R^c$ ring to $Cp^4R^d$ ring, or crosslink one $Cp^4R^d$ ring to $M^2$, or combinations thereof, and m is 1 or 0;

$$(Cp^5R^e)B^2(J)M^3Z^3{}_2 \quad \text{[Chemical Formula 5]}$$

in Chemical Formula 5, $M^3$ is a Group 4 transition metal;

$Cp^5$ is any one selected from the group consisting of cyclopentadienyl, indenyl, 4,5,6,7-tetrahydro-1-indenyl and fluorenyl radical, each of which may be substituted by hydrocarbon having 1 to 20 carbon atoms;

$R^e$ is hydrogen, $C_1$-$C_{20}$ alkyl, $C_1$-$C_{10}$ alkoxy, $C_2$-$C_{20}$ alkoxyalkyl, $C_6$-$C_{20}$ aryl, $C_6$-$C_{10}$ aryloxy, $C_2$-$C_{20}$ alkenyl, $C_7$-$C_{40}$ alkylaryl, $C_7$-$C_{40}$ arylalkyl, $C_8$-$C_{40}$ arylalkenyl, or $C_2$-$C_{10}$ alkynyl;

$Z^3$ is halogen atom, $C_1$-$C_{20}$ alkyl, $C_2$-$C_{10}$ alkenyl, $C_7$-$C_{40}$ alkylaryl, $C_7$-$C_{40}$ arylalkyl, $C_6$-$C_{20}$ aryl, substituted or unsubstituted $C_1$-$C_{20}$ alkylidene, substituted or unsubstituted amino, $C_2$-$C_{20}$ alkylalkoxy, or $C_7$-$C_{40}$ arylalkoxy;

$B^2$ is one or more selected from the radicals containing carbon, germanium, silicon, phosphorous or nitrogen atom, which crosslink $Cp^5R^e$ ring to J, or combinations thereof; and J is any one selected from the group consisting of $NR^f$, O, $PR^f$ and S, wherein $R^f$ is $C_1$-$C_{20}$ alkyl, aryl, substituted alkyl or substituted aryl.

The substituents of Chemical Formulae 1, 3, 4 and 5 are more specifically explained as follows.

The $C_1$-$C_{20}$ alkyl group may include a linear or branched alkyl, and specific example thereof may include methyl, ethyl, propyl, isopropyl, n-butyl, tert-butyl, pentyl, hexyl, heptyl, octyl, and the like, but is not limited thereto.

The $C_2$-$C_{20}$ alkenyl may include a linear or branched alkenyl, and specific example thereof may include allyl, ethenyl, propenyl, butenyl, pentenyl, and the like, but is not limited thereto.

The $C_6$-$C_{20}$ aryl may include a single ring aryl or a condensed ring aryl, and specific example thereof may include phenyl, biphenyl, naphthyl, phenanthrenyl, fluorenyl, and the like, but is not limited thereto.

The $C_5$-$C_{20}$ heteroaryl may include a single ring heteroaryl or a condensed ring heteroaryl, and specific example thereof may include carbazolyl, pyridyl, quinoline, isoquinoline, thiophenyl, furanyl, imidazole, oxazolyl, thiazolyl, triazine, tetrahydropyranyl, tetrahydrofuranyl, and the like, but is not limited thereto.

The $C_1$-$C_{20}$ alkoxy may include methoxy, ethoxy, phenyloxy, cyclohexyloxy, and the like, but is not limited thereto.

The Group 4 transition metal may include titanium, zirconium, hafnium, and the like, but is not limited thereto.

More preferably, $R_1$ to $R_{17}$ and $R_1'$ to $R_9'$ in Chemical Formulae 2a, 2b and 2c are each independently hydrogen, methyl, ethyl, propyl, isopropyl, n-butyl, tert-butyl, pentyl, hexyl, heptyl, octyl, phenyl, halogen, trimethylsilyl, triethylsilyl, tripropylsilyl, tributylsilyl, triisopropylsilyl, trimethylsilylmethyl, methoxy, or ethoxy, but is not limited thereto.

More preferably, L in Chemical Formula 1 is linear or branched $C_4$-$C_8$ alkylene, but is not limited thereto. Furthermore, the alkylene group may be unsubstituted or substituted by $C_1$-$C_{20}$ alkyl, $C_2$-$C_{20}$ alkenyl, or $C_6$-$C_{20}$ aryl.

Also preferably, A in Chemical Formula 1 is hydrogen, methyl, ethyl, propyl, isopropyl, n-butyl, tert-butyl, methoxymethyl, tert-butoxymethyl, 1-ethoxyethyl, 1-methyl-1-methoxyethyl, tetrahydropyranyl, or tetrahydrofuranyl, but is not limited thereto.

Also preferably, B in Chemical Formula 1 is silicon, but is not limited thereto.

Because the first metallocene compound of Chemical Formula 1 includes the structure in which an indenoindole derivative and/or a fluorene derivative are crosslinked via a bridge and has an unshared electron pair capable of acting as a Lewis base in the ligand structure, it is supported on the surface of a support having a Lewis acid character to show a high polymerization activity even when supported. Furthermore, it is superior in activity because of including the electron-rich indenoindole group and/or fluorene group. In addition, due to a proper steric hindrance and an electronic effect of the ligand, it is low in hydrogen reactivity and also maintains a high activity even in the presence of hydrogen. Further, it can be used for preparing an olefinic polymer of ultra-high molecular weight because nitrogen atom of the indenoindole derivative stabilizes the beta-hydrogen of growing polymer chain with a hydrogen bond and inhibits beta-hydrogen elimination.

According to one embodiment of the present invention, specific examples of the compound represented by Chemical Formula 2a may include one of the compounds represented by the following structural formulae, but the invention is not limited thereto:

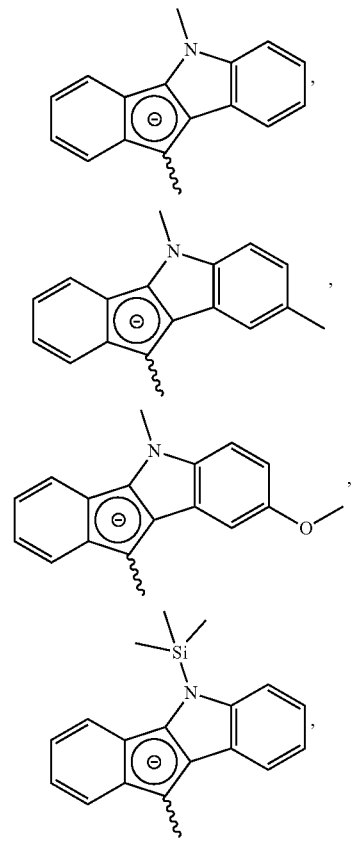

-continued
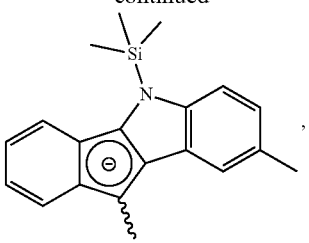
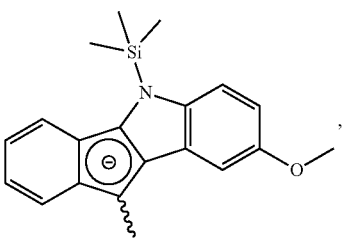
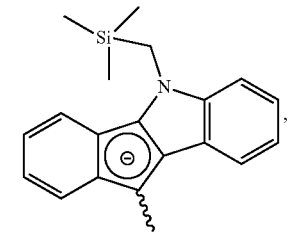
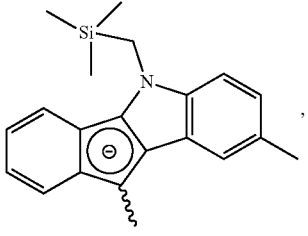
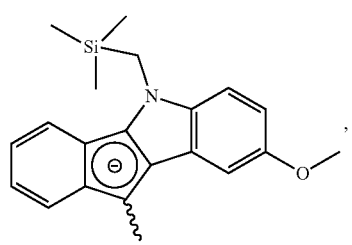
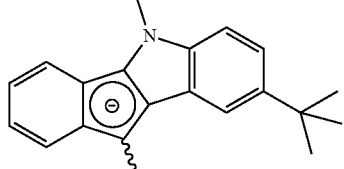
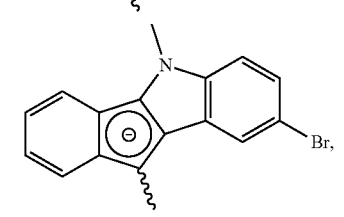
-continued
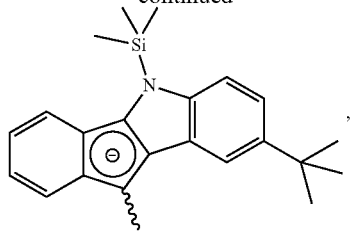
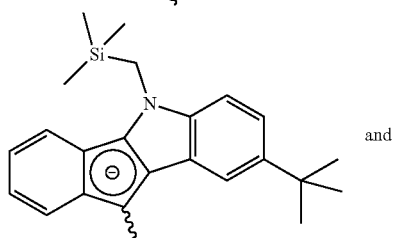
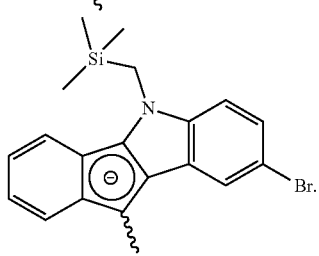
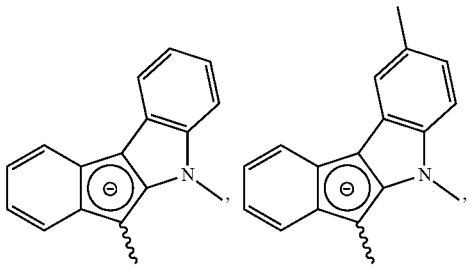
According to one embodiment of the present invention, specific examples of the compound represented by Chemical Formula 2b may include one of the compounds represented by the following structural formulae, but the invention is not limited thereto:
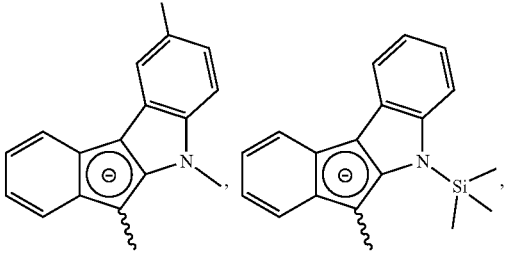

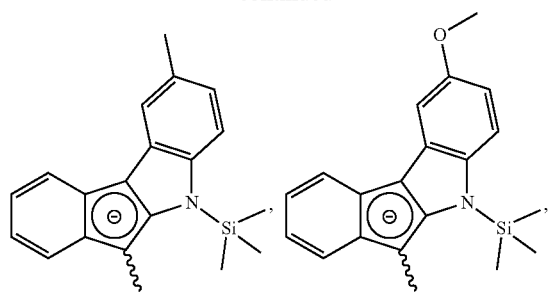

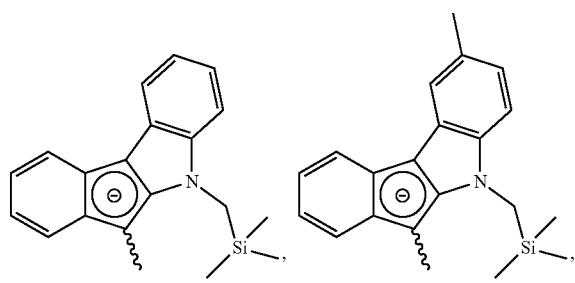

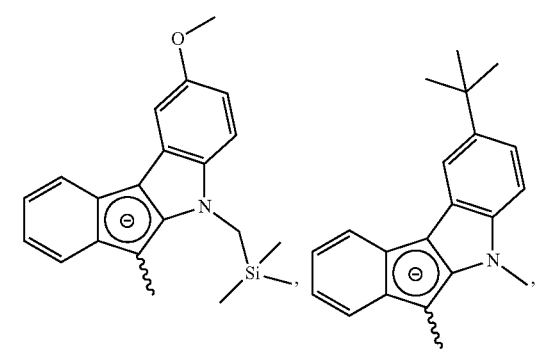

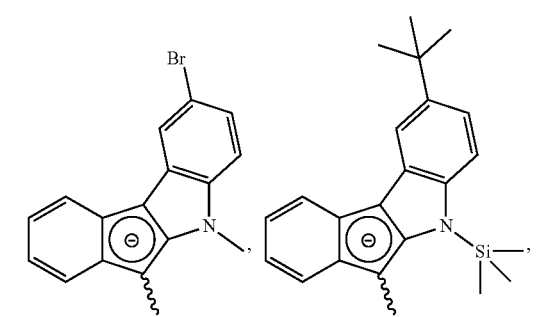

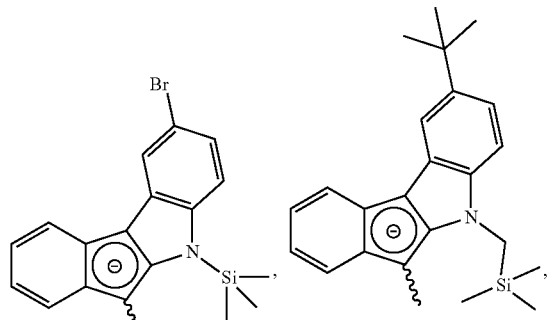

and

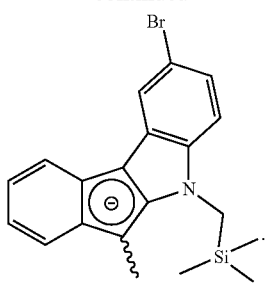

According to one embodiment of the present invention, specific examples of the compound represented by Chemical Formula 2c may include one of the compounds represented by the following structural formulae, but the invention is not limited thereto:

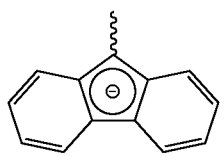

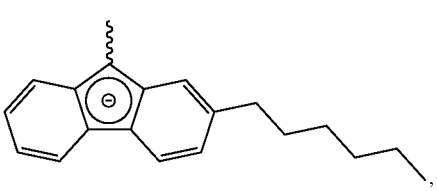

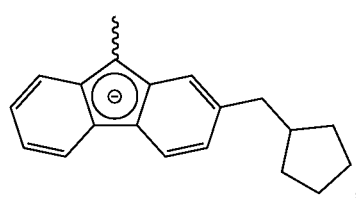

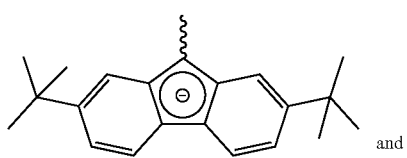

and

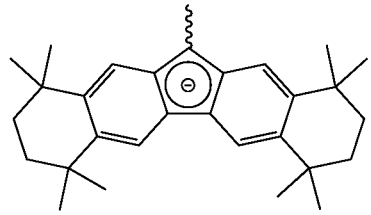

According to one embodiment of the present invention, specific examples of the first metallocene compound represented by Chemical Formula 1 may include one of the compounds represented by the following structural formulae, but the invention is not limited thereto:

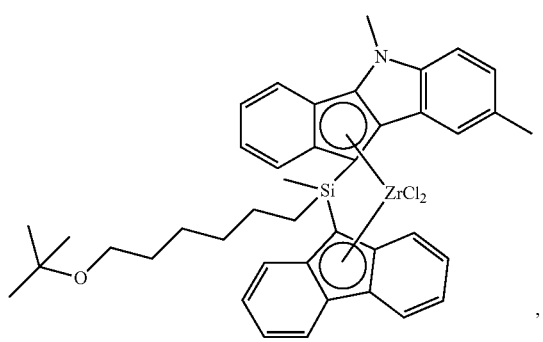
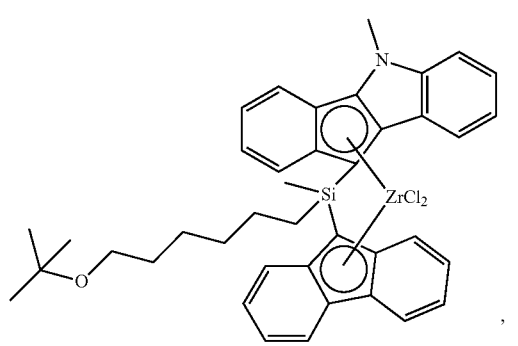
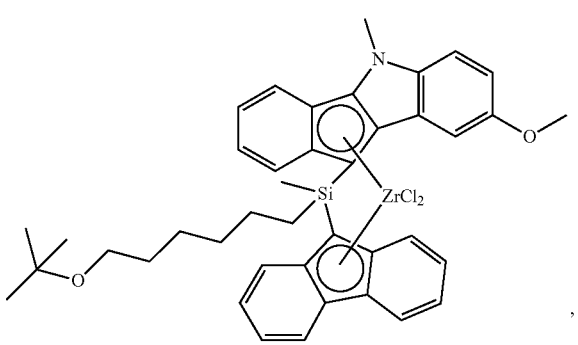
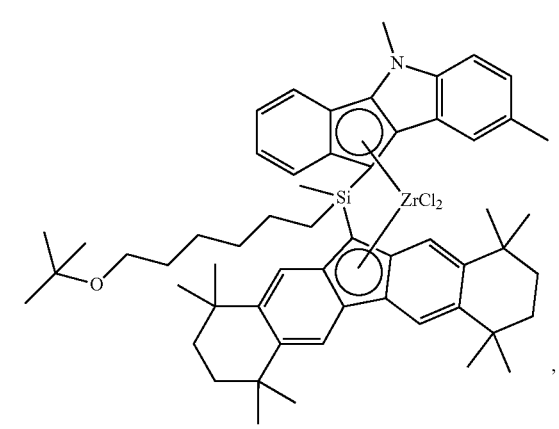
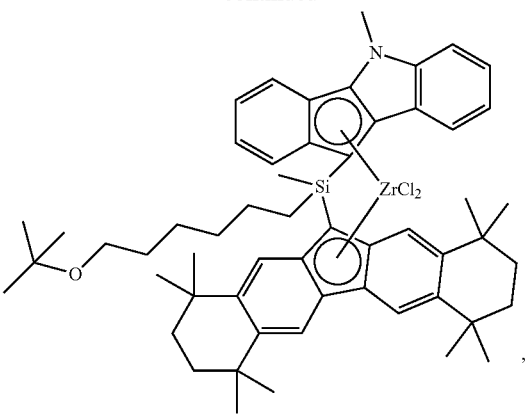
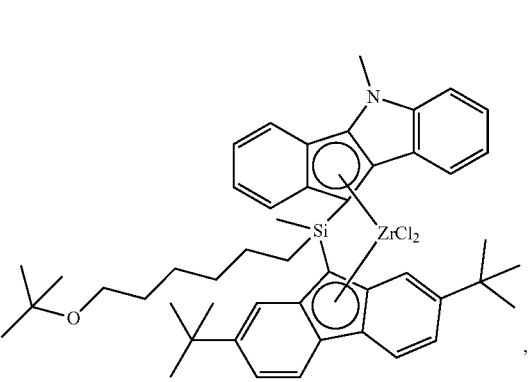
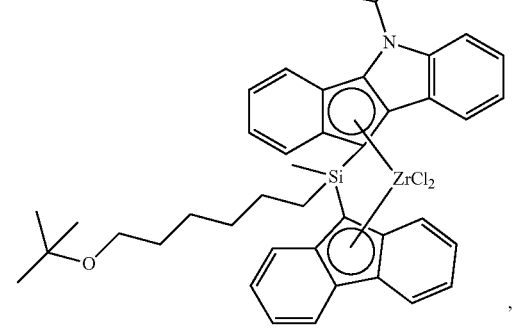

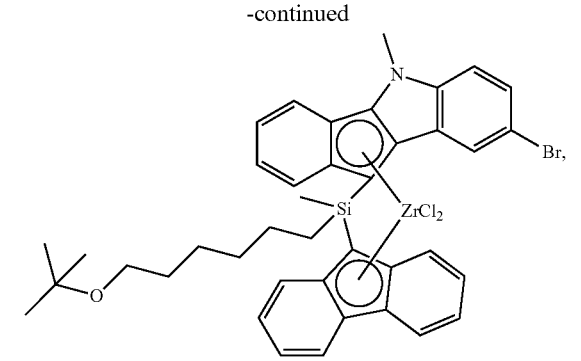
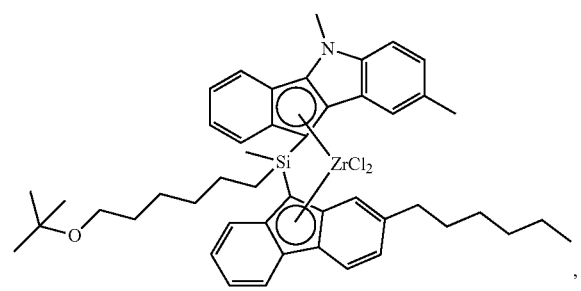
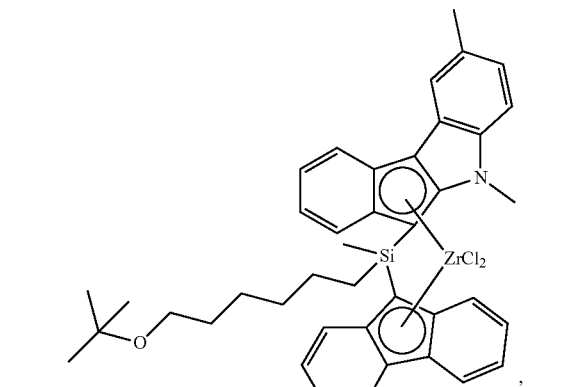
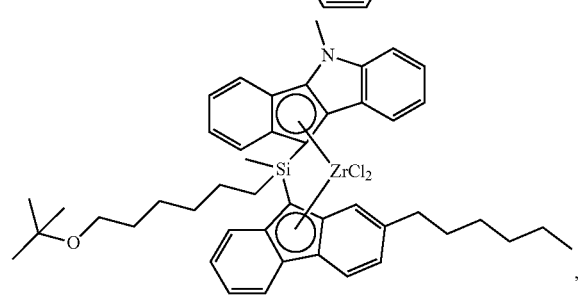
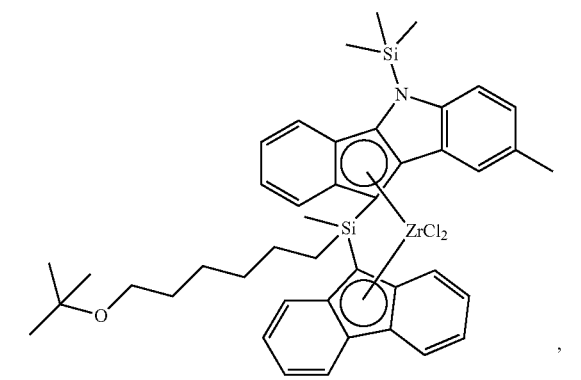
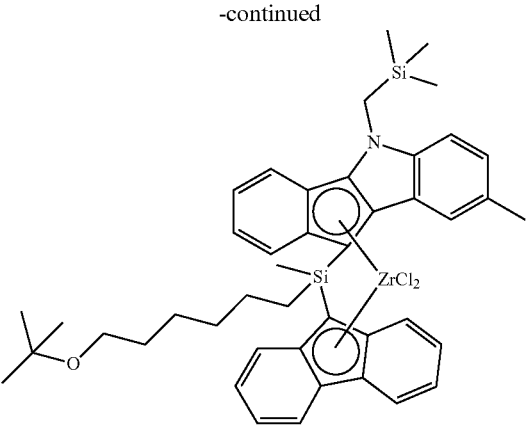
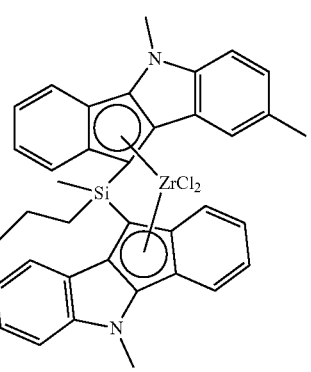
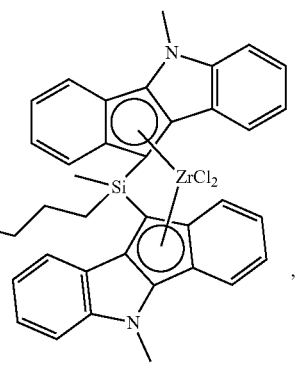
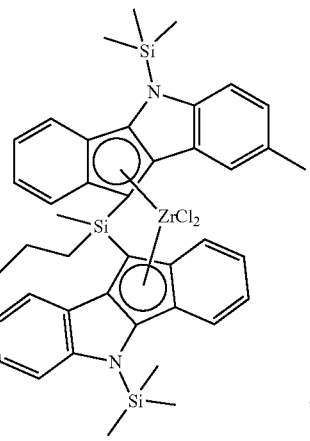

-continued

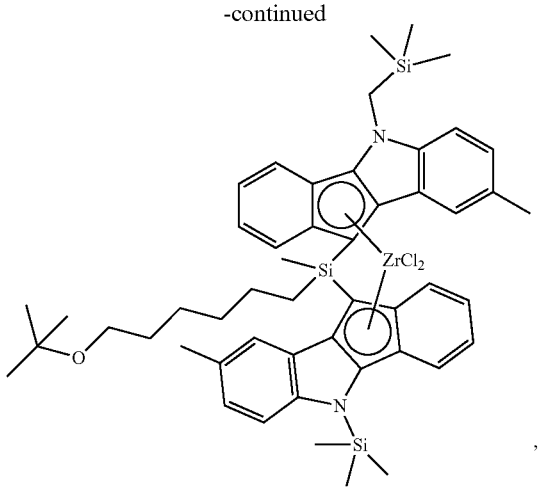

and

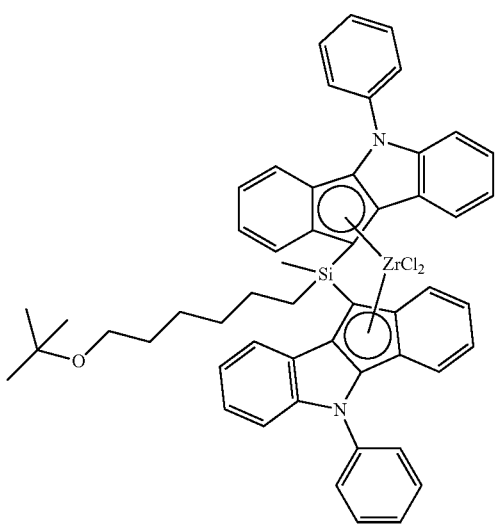

The first metallocene compound of Chemical Formula 1 has a superior activity, and can polymerize an ethylene/alpha-olefin copolymer having high molecular weight. In particular, it can show a high polymerization activity even when it is used in a state of being supported on a support. Therefore, it can prepare an ethylene/alpha-olefin copolymer having ultra-high molecular weight.

Also, even when the polymerization reaction is carried out in the presence of hydrogen in order to prepare an ethylene/alpha-olefin copolymer having high molecular weight and broad molecular weight distribution at the same time, the first metallocene compound of Chemical Formula 1 according to the present invention shows a low hydrogen reactivity and thus can polymerize an ethylene/alpha-olefin copolymer of ultra-high molecular weight still with a high activity. Therefore, even when it is used as a hybrid with a catalyst having different characteristics, it can prepare an ethylene/alpha-olefin copolymer satisfying the characteristics of high molecular weight without lowering of its activity, resulting in the easy preparation of the ethylene/alpha-olefin copolymer having broad molecular weight distribution while containing the ethylene/alpha-olefin copolymer having high molecular weight The first metallocene compound of Chemical Formula 1 may be obtained by connecting an indenoindole derivative and/or a fluorene derivative via a bridge compound to prepare a ligand compound, and then introducing a metal precursor compound therein to perform a metallation. The method for preparing the first metallocene compound will be specifically explained in the examples to be described below.

Examples of the compounds represented by the following Chemical Formula 3 may include one of the compounds represented by the following chemical structures, but the invention is not limited thereto:

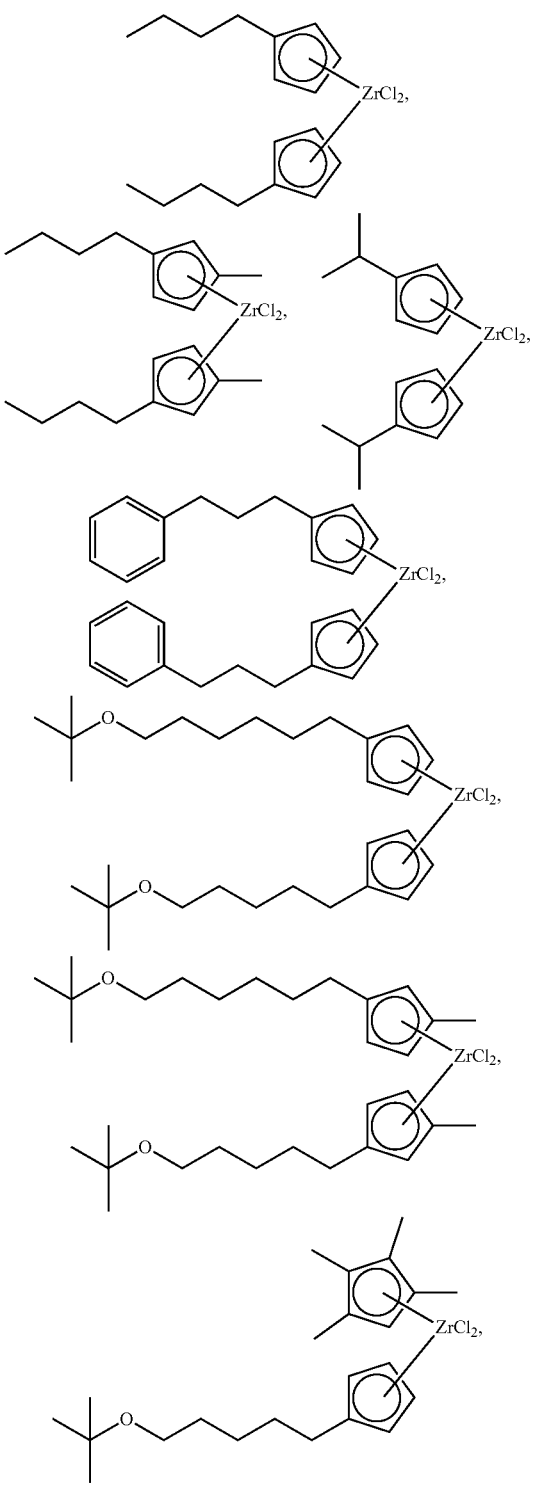

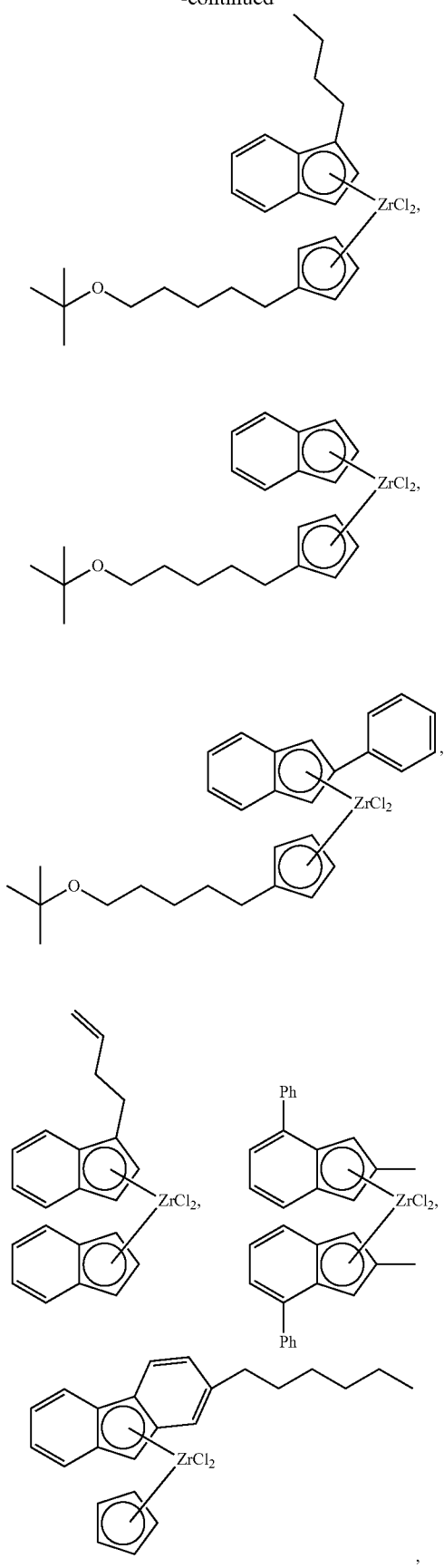

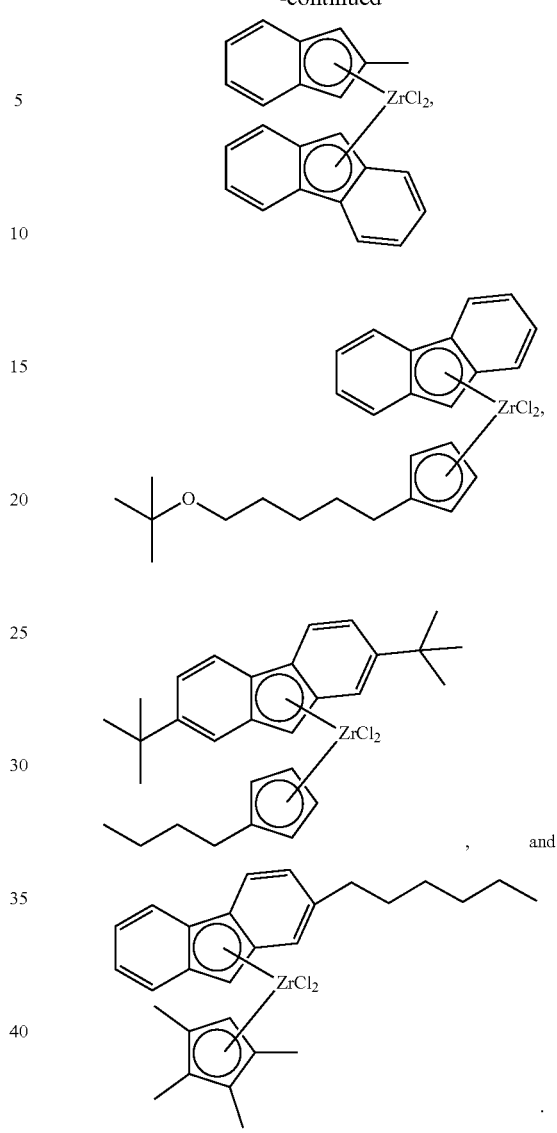

In Chemical Formula 4, "when m is 1" refers to a bridge compound structure in which Cp³R$^c$ ring and Cp⁴R$^d$ ring, or Cp⁴R$^d$ ring and M², are crosslinked by B₁, and "when m is 0" refers to a non-crosslinked compound structure.

Examples of the compounds represented by the following Chemical Formula 4 may include one of the compounds represented by the following chemical structures, but the invention is not limited thereto:

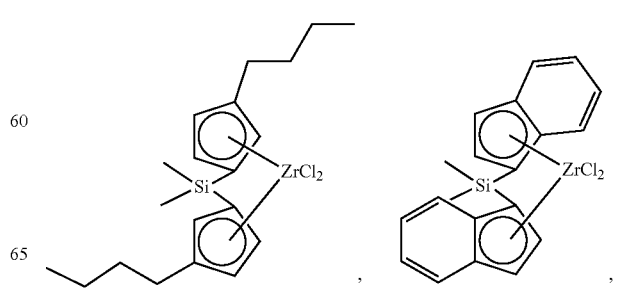

-continued
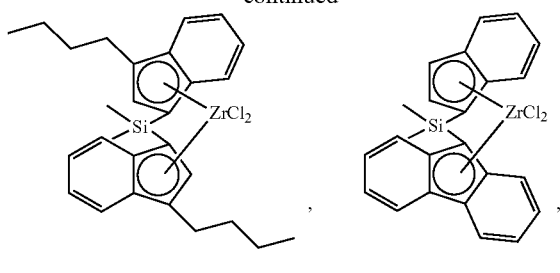
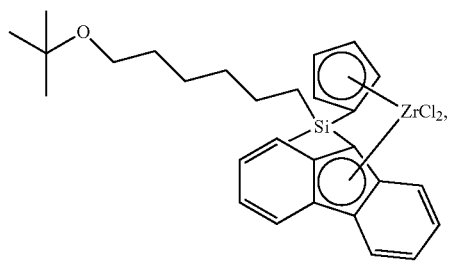
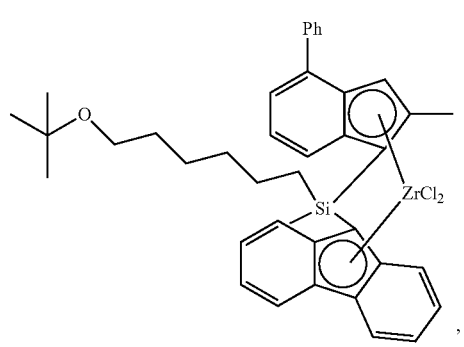
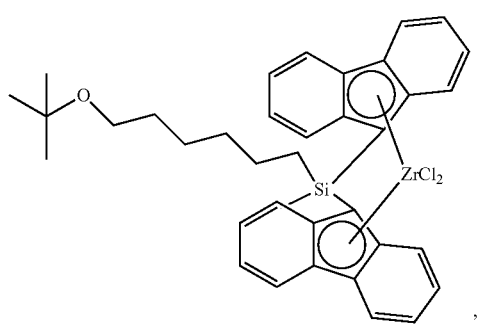
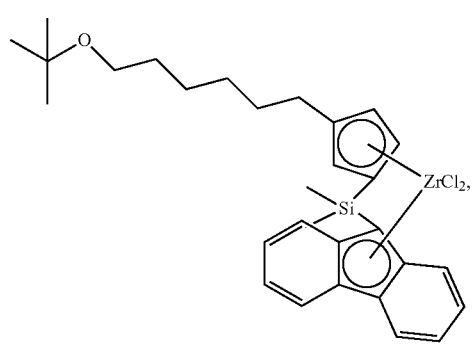
-continued
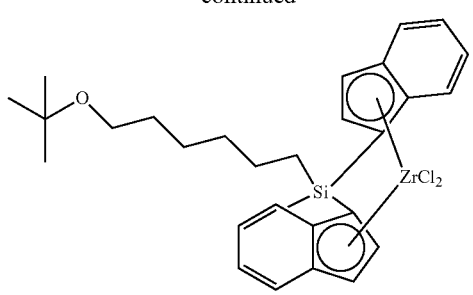
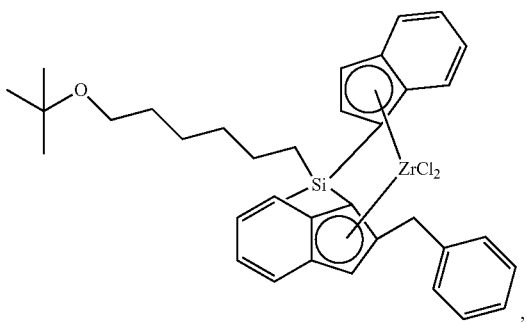
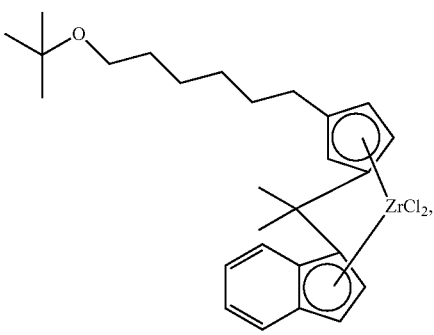
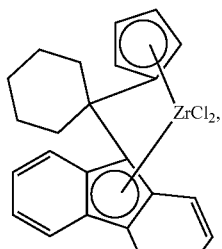
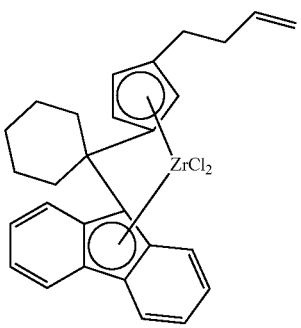
, and

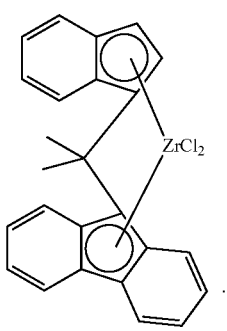
Examples of the compounds represented by the following Chemical Formula 5 may include one of the compounds represented by the following chemical structures, but the invention is not limited thereto:
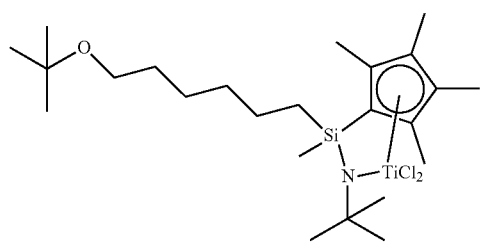
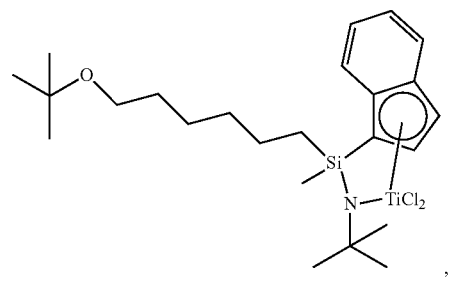
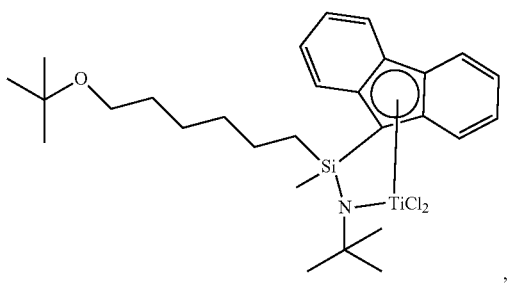
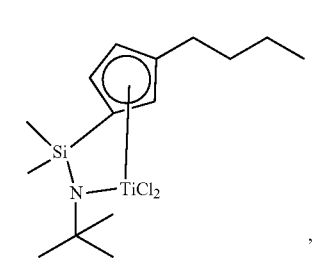
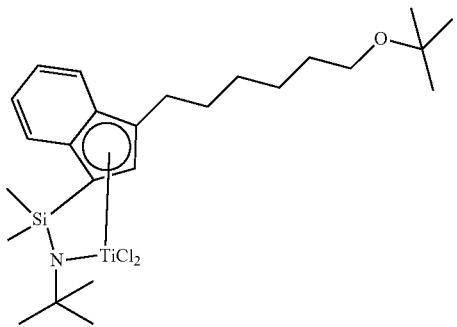
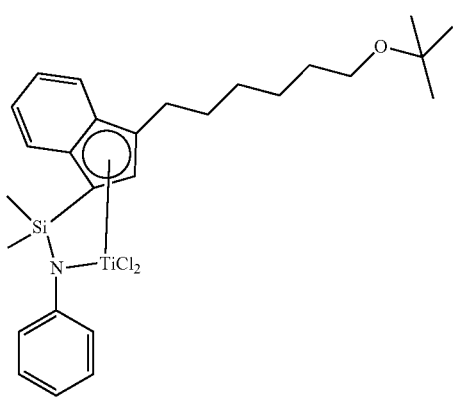
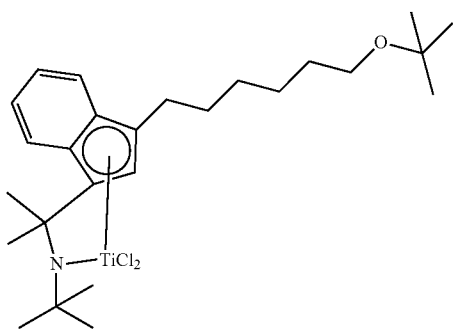
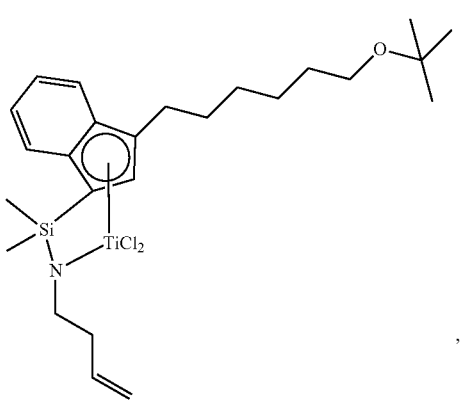
, and -continued

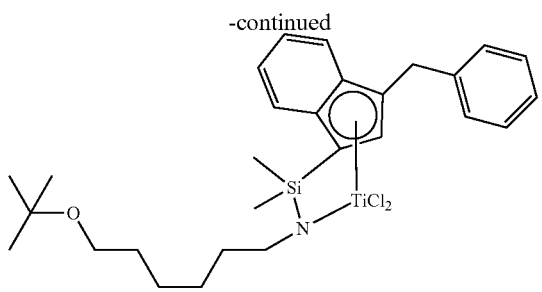

The metallocene catalyst that is used herein may be prepared by supporting one or more of the first metallocene compounds represented by the following Chemical Formula 1 and one or more of the second metallocene compounds selected among the compounds represented by the following Chemical Formulae 3 to 5 with a cocatalyst compound on the support Also, the supported metallocene catalyst may lead to the production of LCB (Long Chain Branch) from the ethylene/alpha-olefin copolymer to be prepared.

In the supported metallocene catalyst according to the present invention, the cocatalyst which is supported together on a support to activate the metallocene compound is an organic metal compound containing a Group 13 metal. The cocatalyst compound is not particularly limited as long as it can be used for the polymerization of olefin in the presence of a typical metallocene catalyst.

Specifically, the cocatalyst compound may comprise one or more of the first aluminum-containing cocatalyst represented by the following Chemical Formula 6 and the second borate-based cocatalyst represented by the following Chemical Formula 7:

$$-[Al(R_{18})-O-]_k- \quad \text{[Chemical Formula 6]}$$

in Chemical Formula 6, each of $R_{18}$ is independently halogen, or unsubstituted or halogen-substituted hydrocarbyl group having 1 to 20 carbon atoms; and k is an integer of 2 or more, $$T^+[BG_4]^- \quad \text{[Chemical Formula 7]}$$

in Chemical Formula 7, $T^+$ is a +1 valent polyatomic ion, B is boron in an oxidation state of +3, and each of G is independently selected from the group consisting of hydride, dialkylamido, halide, alkoxide, aryloxide, hydrocarbyl, halocarbyl and halo-substituted hydrocarbyl, wherein G has less than 20 carbon atoms, provided that G is halide group at one or less position.

By using the first and the second cocatalysts as above, the polyethylene copolymer finally prepared may have more uniform molecular weight distribution, while the polymerization activity can be enhanced.

The first cocatalyst represented by Chemical Formula 6 may be an alkylaluminoxane-based compound wherein the repeating units are combined into a linear, circular or network structure. Specific examples of the first cocatalyst include methylaluminoxane (MAO), ethylaluminoxane, isobutylaluminoxane, butylaluminoxane, and the like.

Also, the second cocatalyst represented by Chemical Formula 7 may be a borate-based compound in the form of a trisubstituted ammonium salt, a dialkyl ammonium salt, or a trisubstituted phosphonium salt. Specific examples of the second cocatalyst include a borate-based compound in the form of a trisubstituted ammonium salt such as trimethylammonium tetraphenylborate, methyldioctadecylammonium tetraphenylborate, triethylammonium tetraphenylborate, tripropylammonium tetraphenylborate, tri(n-butyl) ammonium tetraphenylborate, methyltetradecycloctadecylammonium tetraphenylborate, N,N-dimethylanilium tetraphenylborate, N,N-diethylanilium tetraphenylborate, N,N-dimethyl(2,4,6-trimethylanilium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium, tetrakis(pentafluorophenyl)borate, tripropylammoniumtetrakis (pentafluorophenyl)borate, tri(n-butyl)ammonium tetrakis (pentafluorophenyl)borate, tri(secondary-butyl) ammoniumtetrakis(pentafluorophenyl)borate, N,N-dimethylanilium tetrakis(pentafluorophenyl)borate, N,N-diethylaniliumtetrakis(pentafluorophenyl)borate, N,N-dimethyl(2,4,6-trimethylanilium)tetrakis (pentafluorophenyl)borate, trimethylammoniumtetrakis(2,3,4,6-tetrafluorophenyl)borate, triethylammonium tetrakis(2,3,4,6-tetrafluorophenyl)borate, tripropylammonium tetrakis (2,3,4,6-tetrafluorophenyl)borate, tri(n-butyl)ammonium tetrakis(2,3,4,6-tetrafluorophenyl)borate, dimethyl(t-butyl) ammonium tetrakis(2,3,4,6-tetrafluorophenyl)borate, N,N-dimethylanilium tetrakis(2,3,4,6-tetrafluorophenyl)borate, N,N-diethylanilium tetrakis(2,3,4,6-tetrafluorophenyl)borate, N,N-dimethyl-(2,4,6-trimethylanilium)tetrakis-(2,3,4,6-tetrafluorophenyl)borate, and the like; a borate-based compound in the form of a dialkylammonium salt such as dioctadecylammonium tetrakis(pentafluorophenyl)borate, ditetradecylammonium tetrakis(pentafluorophenyl)borate, dicyclohexylammonium tetrakis(pentafluorophenyl)borate, and the like; or a borate-based compound in the form of a trisubstituted phosphonium salt such as triphenylphosphonium tetrakis(pentafluorophenyl)borate, methyldioctadecylphosphonium tetrakis(pentafluorophenyl)borate or tri(2,6-dimethyl phenyl)phosphonium tetrakis(pentafluorophenyl) borate, and the like.

In the supported metallocene catalyst according to the present invention, the weight ratio between the whole transition metals contained in the first metallocene compound represented by Chemical Formula 1 and the second metallocene compounds represented by Chemical Formulae 3 to 5 and the support may be 1:10 to 1:1,000. When the catalyst contains the support and the metallocene compounds in the above weight ratio, the optimum shape may be provided. Also, the weight ratio of the cocatalyst compound to the support may be 1:1 to 1:100.

In the supported metallocene catalyst according to the present invention, the support that can be used herein includes a support containing a hydroxyl group on its surface, and preferably a support containing a highly reactive hydroxyl group and siloxane group, of which surface is dried to remove moisture.

For example, silica, silica-alumina, silica-magnesia and the like that are dried at a high temperature may be used, and they may usually contain oxides, carbonates, sulfates, and nitrates such as $Na_2O$, $K_2CO_3$, $BaSO_4$, $Mg(NO_3)_2$ or the like.

The support is preferably dried at a temperature of 200 to 800° C., more preferably at 300 to 600° C., and most preferably at 300 to 400° C. If the drying temperature of the support is less than 200° C., it retains moisture too much so that moisture on the surface is reacted with the cocatalyst. If the drying temperature is higher than 800° C., pores on the surface of the support are combined with each other to reduce surface area, and many hydroxyl groups are lost on the surface to remain only siloxane groups. Thus, since the reactive sites with cocatalyst are reduced, it is not preferable.

The amount of hydroxyl group on the surface of the support is preferably 0.1 to 10 mmol/g, and more preferably 0.5 to 5 mmol/g. The amount of hydroxyl group on the surface of the support may be controlled depending on the preparation method and conditions of the support, or drying conditions such as temperature, time, vacuum, spray drying, and the like.

If the amount of hydroxyl group is less than 0.1 mmol/g, the reactive sites with cocatalyst are reduced. If the amount of hydroxyl group is more than 10 mmol/g, it is not desirable because it may be caused by moisture besides the hydroxyl groups present on the surface of support particles.

On the other hand, the ethylene/alpha-olefin copolymer according to the present invention can be prepared by polymerizing ethylene and alpha-olefin in the presence of the supported metallocene catalyst described above.

The polymerization reaction may be carried out by copolymerizing ethylene and alpha-olefin, using one continuous slurry polymerization reactor, a loop slurry reactor, a gas phase reactor, or a solution reactor.

Further, the polymerization temperature may be about 25 to about 500° C., preferably about 25 to about 200° C. more preferably about 50 to about 150° C. Further, the polymerization pressure may be about 1 to about 100 Kgf/cm$^2$, preferably about 1 to about 50 Kgf/cm$^2$, more preferably about 5 to about 30 Kgf/cm$^2$.

The supported catalyst can be injected by dissolving or diluting in $C_5$ to $C_{12}$ aliphatic hydrocarbon solvent, such as pentane, hexane, heptane, nonane, decane and isomers thereof, an aromatic hydrocarbon solvent such as toluene and benzene, or a hydrocarbon solvent substituted by a chlorine atom, such as dichloromethane and chlorobenzene. The solvent used herein is preferably treated with a small amount of alkyl aluminum to remove a small amount of water or air and the like which act as a catalyst poison. This treatment can be performed by further using a co-catalyst.

The ethylene/alpha-olefin copolymer according to the present invention is prepared by copolymerizing ethylene and alpha-olefin monomer, using a catalyst of Chemical Formulae 3 to 5 mainly polymerizing the polymer chains of low molecular weight and a catalyst of Chemical Formula 1 mainly polymerizing the polymer chains of high molecular weight. Due to the interaction of these two or more catalysts, generally the low molecular weight and molecular weight distribution increase.

As a result, the ethylene/alpha-olefin copolymer can represent the molecular weight distribution curve, for example, as shown in FIG. 1, and it can exhibit excellent processability. Because of satisfying the physical properties described above, the ethylene/alpha-olefin copolymer according to the present invention can be preferably applied to a large diameter pipe, a complex pipe or the like.

Advantageous Effects

As described above, the ethylene/alpha-olefin copolymer according to the present invention has excellent processability and thus it can be applied to a large diameter pipe, a complex pipe or the like.

BRIEF DESCRIPTION OF DRAWINGS

FIG. 1 shows GPO curve of a copolymer prepared in a comparative example and an example of the present invention.

FIG. 2 shows the results obtained by fitting a graph of complex viscosity versus frequency in accordance with a comparative example and an example of the present invention to a power law and a cross model.

FIG. 3 shows the results obtained by fitting a graph of complex viscosity versus frequency in accordance with a comparative example and an example of the present invention to a cross model.

DETAILED DESCRIPTION OF THE EMBODIMENTS

Hereinafter, preferred examples are provided for better understanding of the invention. However, these examples are for illustrative purposes only and the invention is not ion are not intended to be limited by these examples.

First Metallocene Compound

Preparation Example 1

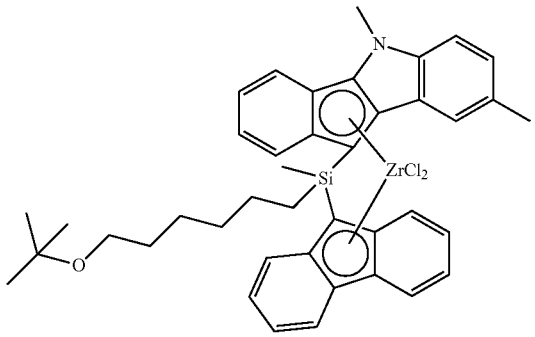

1-1) Preparation of Ligand Compound 2 g of fluorene was dissolved in 5 mL of MTBE and 100 mL of hexane, and 5.5 mL of 2.5 M n-BuLi hexane solution was added dropwise in a dry ice/acetone bath and stirred overnight at room temperature. 3.6 g of (6-(tert-butoxy) hexyl)dichloro(methyl)silane was dissolved in 50 mL of hexane, and fluorene-Li slurry was transferred under a dry ice/acetone bath for 30 minutes and stirred overnight at room temperature. At the same time, 5,8-dimethyl-5,10-dihydroindeno[1,2-b]indole (12 mmol, 2.8 g) was also dissolved in THF (60 mL), and 2.5 M n-BuLi hexane solution (5.5 mL) was added dropwise in a dry ice/acetone bath and stirred overnight at room temperature. The reaction solution of fluorene and (6-(tert-butoxy)hexyl)dichloro(methyl)silane was subjected to NMR sampling to confirm the completion of reaction. Thereafter, the 5,8-dimethyl-5,10-dihydroindeno[1,2-b]indole-Li solution was transferred under a dry ice/acetone bath and stirred overnight at room temperature. After reaction, the reaction mixture was extracted with ether/water and the remaining moisture in the organic layer was removed with MgSO$_4$ to give the ligand compound (Mw 597.90, 12 mmol). It could be confirmed by $^1$H-NMR that two isomers were produced.

$^1$H NMR (500 MHz, d$_6$-benzene): −0.30~−0.18 (3H, d), 0.40 (2H, m), 0.65~1.45 (8H, m), 1.12 (9H, d), 2.36~2.40 (3H, d), 3.17 (2H, m), 3.41~3.43 (3H, d), 4.17~4.21 (1H, d), 4.34~4.38 (1H, d), 6.90~7.80 (15H, m)

1-2) Preparation of Metallocene Compound 7.2 g (12 mmol) of the ligand compound synthesized in 1-1 above was dissolved in 50 mL of diethylether, and 11.5 mL of 2.5 M n-BuLi hexane solution was added dropwise in a dry ice/acetone bath and stirred overnight at room temperature. The mixture was dried under vacuum to give sticky oil having a brown color. This oil was dissolved in toluene to give a slurry. $ZrCl_4(THF)_2$ was prepared, and 50 mL of toluene was added thereto to prepare a slurry. 50 mL of toluene slurry of $ZrCl_4(THF)_2$ was transferred in a dry ice/acetone bath. As the mixture was stirred overnight at room temperature, the color was changed to violet. The reaction solution was filtered to remove LiCl. The filtrate was dried under vacuum to remove toluene, hexane was added thereto, and the mixture was sonicated for 1 hour. The slurry was filtered to give the metallocene compound (6 g, Mw 758.02, 7.92 mmol, Yield 66 mol %) having a dark violet color as a filtered solid. Two isomers were observed through $^1$H-NMR.

$^1$H NMR (500 MHz, $CDCl_3$): 1.19 (9H, d), 1.71 (3H, d), 1.50~1.70 (4H, m), 1.79 (2H, m), 1.98~2.19 (4H, m), 2.58 (3H, s), 3.38 (2H, m), 3.91 (3H, d), 6.66~7.88 (15H, m)

Preparation Example 2

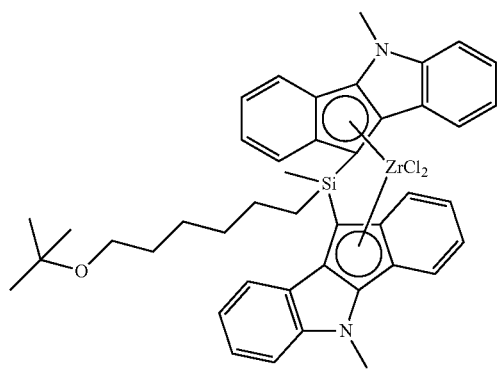

2-1) Preparation of Ligand Compound

To a 250 mL flask was introduced 2.63 g (12 mmol) of 5-methyl-5,10-dihydroindeno[1,2-b]indole, which was then dissolved in 50 mL of THF. Then, 6 mL of 2.5 M n-BuLi hexane solution was added dropwise in a dry ice/acetone bath and stirred overnight at room temperature. In another 250 mL flask, 1.62 g (6 mmol) of (6-(tert-butoxy)hexyl)dichloro(methyl)silane was prepared by dissolving it in 100 mL of hexane, which was then slowly added dropwise to a lithiated solution of 5-methyl-5,10-dihydroindeno[1,2-b]indole under a dry ice/acetone bath and stirred overnight at room temperature. After reaction, the mixture was extracted with ether/water. The organic layer was treated with $MgSO_4$ to remove the remaining moisture and then dried under vacuum to give 3.82 g (6 mmol) of the ligand compound which was confirmed by $^1$H-NMR.

$^1$H NMR (500 MHz, $CDCl_3$): −0.33 (3H, m), 0.86~1.53 (10H, m), 1.16 (9H, d), 3.18 (2H, m), 4.07 (3H, d), 4.12 (3H, d), 4.17 (1H, d), 4.25 (1H, d), 6.95~7.92 (16H, m)

2-2) Preparation of Metallocene Compound 3.82 g (6 mmol) of the ligand compound synthesized in 2-1 above was dissolved in 100 mL of toluene and 5 mL of MTBE, and then 5.6 mL (14 mmol) of 2.5 M n-BuLi hexane solution was added dropwise in a dry ice/acetone bath and stirred overnight at room temperature. In another flask, 2.26 g (6 mmol) of $ZrCl_4(THF)_2$ was prepared as a slurry by adding 100 mL of toluene. $ZrCl_4(THF)_2$ as a toluene slurry was transferred to the litiated ligand in a dry ice/acetone bath. The mixture was stirred overnight at room temperature, and the color was changed to violet. The reaction solution was filtered to remove LiCl. The filtrate thus obtained was dried under vacuum, hexane was added thereto, and the mixture was sonicated. The slurry was filtered to give the metallocene compound (3.40 g, Yield 71.1 mol %) having a dark violet color as a filtered solid.

$^1$H NMR (500 MHz, $CDCl_3$): 1.74 (3H, d), 0.85~2.33 (10H, m), 1.29 (9H, d), 3.87 (3H, s), 3.92 (3H, s), 3.36 (2H, m), 6.48~8.10 (16H, m)

Second Metallocene Compound

Preparation Example 3: Preparation of [tBu-O—$(CH_2)_6$—$C_5H_4]_2ZrCl_2$]

t-Butyl-O—$(CH_2)_6$—Cl was prepared using 6-chlorohexanol according to the method described in Tetrahedron Lett. 2951 (1988), and then reacted with NaCp to give t-Butyl-O—$(CH_2)_6$—$C_5H_5$ (Yield 60%, b.p. 80° C./0.1 mmHg).

Also, t-Butyl-O—$(CH_2)_6$—$C_5H_5$ was dissolved in THF at −78° C., n-BuLi was slowly added thereto, and the mixture was warmed to room temperature and then reacted for 8 hours. Again at a temperature of −78° C., thus prepared lithium salt solution was slowly added up to a suspension solution of $ZrCl_4(THF)_2$ (1.70 g, 4.50 mmol)/THF (30 mL) and the mixture was further reacted at room temperature for 6 hours.

All volatile substances were dried under vacuum and hexane solvent was added to the resulting oily liquid substance, which was then filtered. The filtrate was dried under vacuum, and hexane was added to induce a precipitate at a low temperature (−20° C.). The resulting precipitate was filtered at a low temperature to give [tBu-O—$(CH_2)_6$—$C_5H_4]_2ZrCl_2$ compound (Yield 92%) as a white solid.

$^1$H NMR (300 MHz, $CDCl_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H)

$^{13}$C NMR ($CDCl_3$): 135.09, 116.66, 112.28, 72.42, 61.52, 30.66, 30.61, 30.14, 29.18, 27.58, 26.00

Hybrid Supported Catalyst

Examples 1 and 2

3.0 kg of toluene solution was added to a 20 L sus autoclave reactor and the reactor temperature was maintained at 40° C. 500 g of silica (SP2212 produced by Grace Davison) was added to the reactor, and silica was sufficiently dispersed. Then, 2.78 kg of 10 wt % methyl aluminoxane (MAO)/toluene solution was added to the reactor. Then, the reaction temperature was raised up to 80° C. and the mixture was stirred at 200 rpm for 15 hours or more. The reactor temperature was again lowered to 40° C., and then 300 g of 7.5 wt % Catalyst Preparation Example 2/toluene solution was added to the reactor and stirred at 200 rpm for 1 hour. 250 g of 8.8 wt % Catalyst Preparation Example 1/toluene solution was added to the reactor and stirred at 200 rpm for 1 hour. Catalyst Preparation Example 3 (20 g) was dissolved in toluene and added to the reactor, and the mixture was stirred at 200 rpm for 2 hours. 70 g of cocatalyst (anilinium tetrakis(pentafluorophenyl)borate) was diluted in 70 g of tolune and added to the reactor, and then stirred at 200 rpm for 15 hours or more. After lowering the reactor temperature to room temperature, the stirring was stopped. Then, settling was performed for 30 minutes and the reaction solution was subjected to decantation. Toluene slurry was transferred to a filter dryer and filtered. 3.0 kg of toluene was added to the reactor and stirred for 10 minutes. Then, stirring was stopped and filtering was performed. 3.0 kg of hexane was added to the reactor and stirred for 10 minutes. Then, stirring was stopped and filtering was performed. The filtrate was dried at 50° C. under reduced pressure for 4 hours to produce a 500 g-SiO$_2$-supported catalyst.

[Ethylene/1-Butene Copolymer]

The respective hybrid supported metallocene catalysts prepared in Examples 1 and 2 were subjected to bimodal operation with two reactors by using a hexane slurry stirred tank process polymerization machine to produce an olefin polymer. As a comonomer, 1-butene was used.

The polymerization conditions using the respective hybrid supported metallocene catalysts prepared in Examples 1 and 2 are summarized in Table 1 below.

TABLE 1

| Catalyst used | Example 1 | Example 2 |
|---|---|---|
| R1 ethylene supply amount (kg/hr) | 7.0 | 7.0 |
| R1 pressure (kg/cm$^2$) | 7.5 | 7.2 |
| R1 temperature (° C.) | 84.4 | 85.0 |
| R1 hydrogen injection amount (g/hr) | 3.10 | 2.44 |
| R2 ethylene supply amount (kg/hr) | 6.0 | 6.0 |
| R2 pressure (kg/cm$^2$) | 4.7 | 4.8 |
| R2 temperature(° C.) | 75.2 | 73.0 |
| R2 1-butene injection amount (g/hr) | 18.0 | 18.0 |
| Catalytic activity (kg PE/g SiO$_2$) | 6.1 | 7.8 |

Comparative Examples 1 to 3

For comparison with the polymers produced using the hybrid supported metallocene catalysts from Examples 1 and 2, the following copolymers having similar density were used as Comparative Examples.

Comparative Example 1

Hostalene 4731B available from LyondellBasell Industries

Comparative Example 2

XRT-70 available from Total Refining & Chemicals

Comparative Example 3

XP9020 available from Daelim Industrial Co., Ltd.

[Evaluation of Physical Properties of Copolymer]

The physical properties of the copolymers prepared in Examples and Comparative Examples were evaluated by the following methods.

1) Density: ASTM1505

2) Melt Flow Rate (MFR, 5 kg/21.6 kg): measured at a temperature of 190° C., ASTM1238

3) MFRR (MFR$_{21.6}$/MFR$_5$): the ratio where MFR$_{21.6}$ melt index (MI, load: 21.6 kg) is divided by MFR$_5$ (MI, load: 5 kg).

4) Mn, Mw, MWD, GPC curve: samples were melted and pre-treated in 1,2,4-trichlorobenzene containing BHT 0.0125% using PL-SP260 at 160° C. for 10 hours. The number average molecular weight and the weight average molecular weight were measured at a temperature of 160° C. using PL-GPC220. The molecular weight distribution was indicated by the ratio of the weight average molecular weight and number average molecular weight.

5) Graph of the complex viscosity versus frequency, fitting the power law and cross model: the complex viscosity was measured with ARES (Advanced Rheometric Expansion System) (TA Instruments). The samples were set using parallel plates with 25.0 mm diameter at 190° C. so that the gap between plates becomes 2.0 mm. Measurements were conducted in dynamic strain frequency sweep mode and in the frequency range of 0.05 rad/s to 500 rad/s at a strain rate of 5%. 10 points for each decade, a total of 41 points, were measured. The power law and cross model fitting was carried out by using a TA Orchestrator software which is a measurement program.

First, among the above results, the results relating to the physical properties of the copolymers are shown in Table 2 below. Also, GPC curve of the respective copolymers is shown in FIG. 1.

TABLE 2

| | Unit | Comparative Example 1 | Comparative Example 2 | Comparative Example 3 | Example 1 | Example 2 |
|---|---|---|---|---|---|---|
| Density | g/cm$^3$ | 0.947 | 0.947 | 0.941 | 0.9432 | 0.9448 |
| MFR$_5$ | g/10 min | 0.45 | 0.75 | 0.42 | 0.31 | 0.23 |
| MFR$_{21.6}$ | g/10 min | 12.4 | 18.6 | 9.6 | 10.1 | 7.5 |
| MFRR$_{21.6/5}$ | — | 28 | 25 | 22 | 33 | 33 |
| Mn | — | 13,100 | 14,400 | 14,100 | 12,500 | 11,100 |
| Mw | — | 197,000 | 189,000 | 181,000 | 219,000 | 239,000 |
| MWD | — | 15.10 | 13.08 | 12.83 | 17.52 | 21.54 |

Next, a graph of the complex viscosity versus frequency of the copolymer prepared in Example 2, and the results obtained by fitting the graph to power law and cross model are shown in FIG. 2.

As shown in FIG. 2, it could be confirmed that the graph of the complex viscosity versus frequency of the copolymer prepared in Example 2, and the results obtained by fitting the graph to the power law and cross model were very similar, and that both power law and cross model were suitable models to evaluate quantitatively the flow properties of the copolymers according to the present invention.

The copolymers prepared in Examples and Comparative Examples were fitted to the power law and cross model, and the values of variables thus obtained are shown in Table 3 below. In addition, based on the resulting values of variables, the values of complex viscosity at the frequencies of 800 rad/s and 1,200 rad/s in the cross model are shown in Table 3 below.

TABLE 3

| | | Comparative Example 1 | Comparative Example 2 | Comparative Example 3 | Example 1 | Example 2 |
|---|---|---|---|---|---|---|
| Power Law | $C_1$ | 214950 | 187270 | 205150 | 360090 | 337500 |
| | $C_2$ | −0.5111 | −0.4978 | −0.4446 | −0.6141 | −0.6277 |
| Cross Model | $C_1$ | 645230 | 590910 | 376790 | 1978500 | 1958600 |
| | $C_2$ | 1.81966 | 2.22020 | 0.33886 | 6.57477 | 7.09718 |
| | $C_3$ | 0.33584 | 0.36301 | 0.25547 | 0.29941 | 0.28975 |
| Processing area | 800 rad/s | 5075.7 | 4988.3 | 5727.0 | 4879.7 | 4222.2 |
| | 1200 rad/s | 3884.6 | 3860.3 | 4251.5 | 3675.2 | 3160.6 |

If the polyethylene copolymers were applied to the large-diameter pipe or the composite pipe, they received a strong pressure and thus, it could be evaluated that the lower the complex viscosity at high frequency range, the higher the processability. Accordingly, it was possible to predict that the lower the complex viscosity value at 800 rad/s and 1200 rad/s which were in the range of high frequencies in the cross model, the actual processability was excellent.

Thus, as shown in Table 3, it could be confirmed that the complex viscosity values of Examples compared to Comparative Examples was low at frequencies of 800 rad/s and 1,200 rad/s. Accordingly, the polyethylene copolymer according to the present invention had excellent processability at high shear rate and thus it could be preferably applied to the processing of a large diameter pipe or a complex pipe.

The invention claimed is:

1. An ethylene/alpha-olefin copolymer in which:
the density (g/cm³) is 0.930 to 0.950;
$MFR_5$ (g/10 min, measured at 190° C. in accordance with ASTM 1238) is 0.1 to 5;
the melt flow rate ratio ($MFR_{21.6}/MFR_5$, measured at 190° C. in accordance with ASTM 1238) is 10 to 200; and
when a graph of complex viscosity ($\eta^*$[Pa·s]) versus frequency ($\omega$[rad/s]) is fitted to the power law of the following Equation 1, a $C_1$ value is 250,000 to 400,000 and a $C_2$ value is −0.7 to −0.5, and when fitted to the cross model of the following Equation 2, a $C_1$ value is 1,500,000 to 2,500,000, a $C_2$ value is 3 to 10, a $C_3$ value is 0.2 to 0.3, x is frequency, and y is complex viscosity:

$$y = c_1 x^{c_2} \quad \text{[Equation 1]}$$

$$y = \frac{c_1}{1 + (c_2 x)^{(1-c_3)}}. \quad \text{[Equation 2]}$$

2. The ethylene/alpha-olefin copolymer according to claim 1 wherein when x in Equation 2 is 800, the value of y is 3,000 to 5,000.

3. The ethylene/alpha-olefin copolymer according to claim 2 wherein the value of y is 4,000 to 4,900.

4. The ethylene/alpha-olefin copolymer according to claim 1 wherein when x in Equation 2 is 1,200, the value of y is 3,000 to 3,800.

5. The ethylene/alpha-olefin copolymer according to claim 4 wherein the value of y is 3,000 to 3,700.

6. The ethylene/alpha-olefin copolymer according to claim 1 wherein the $C_2$ value in Equation 2 is 5 to 8.

7. The ethylene/alpha-olefin copolymer according to claim 1 wherein the ethylene/alpha olefin copolymer has a weight average molecular weight (g/mol) of 10,000 to 400,000, and a molecular weight distribution (Mw/Mn, PDI) of 5 to 30.

8. The ethylene/alpha-olefin copolymer according to claim 1 wherein the alpha-olefin is one or more selected from the group consisting of 1-butene, 1-pentene, 1-hexene, 4-methyl-1-pentene, 1-octene, 1-decene, 1-dodecene, 1-tetradecene, 1-hexadecene, 1-octadecene and 1-eicosene.

9. The ethylene/alpha-olefin copolymer according to claim 1 wherein the ethylene/alpha-olefin copolymer is prepared by polymerizing ethylene and alpha-olefin in the presence of one or more of the first metallocene compounds represented by the following Chemical Formula 1; and one ore more of the second metallocene compounds selected among the compounds represented by the following Chemical Formulae 3 to 5:

[Chemical Formula 1]

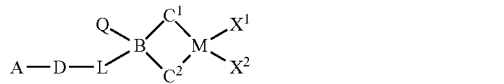

in Chemical Formula 1,

A is hydrogen, halogen, $C_1$-$C_{20}$ alkyl, $C_2$-$C_{20}$ alkenyl, $C_6$-$C_{20}$ aryl, $C_7$-$C_{20}$ alkylaryl, $C_7$-$C_{20}$ arylalkyl, $C_1$-$C_{20}$ alkoxy, $C_2$-$C_{20}$ alkoxyalkyl, $C_3$-$C_{20}$ heterocycloalkyl, or $C_5$-$C_{20}$ heteroaryl;

D is —O—, —S—, —N(R)—, or —Si(R)(R')—, wherein R and R' are the same as or different from each other, and each independently hydrogen, halogen, $C_1$-$C_{20}$ alkyl, $C_2$-$C_{20}$ alkenyl, or $C_6$-$C_{20}$ aryl;

L is $C_1$-$C_{10}$ linear or branched alkylene;

B is carbon, silicon, or germanium;

Q is hydrogen, halogen, $C_1$-$C_{20}$ alkyl, $C_2$-$C_{20}$ alkenyl, $C_6$-$C_{20}$ aryl, $C_7$-$C_{20}$ alkylaryl, or $C_7$-$C_{20}$ arylalkyl;

M is a Group 4 transition metal;

$X^1$ and $X^2$ are the same as or different from each other, and each independently halogen, $C_1$-$C_{20}$ alkyl, $C_2$-$C_{20}$ alkenyl, $C_6$-$C_{20}$ aryl, nitro, amido, $C_1$-$C_{20}$ alkylsilyl, $C_1$-$C_{20}$ alkoxy, or $C_1$-$C_{20}$ sulfonate;

$C^1$ and $C^2$ are the same as or different from each other, and each independently represented by any one of the following Chemical Formula 2a, Chemical Formula 2b or Chemical Formula 2c, provided that both of $C^1$ and $C^2$ are not represented by the following Chemical Formula 2c:

[Chemical Formula 2a]

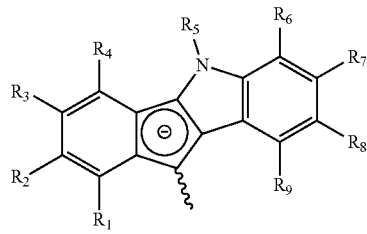

[Chemical Formula 2b]

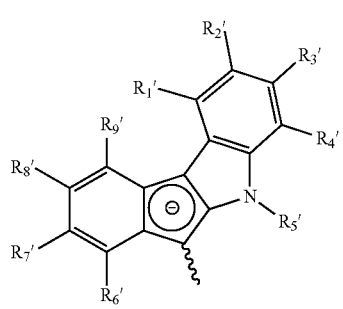

[Chemical Formula 2c]

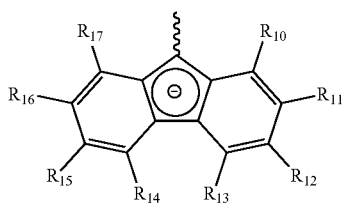

in Chemical Formulae 2a, 2b and 2c, $R_1$ to $R_{17}$ and $R_1'$ to $R_9'$ are the same as or different from each other, and each independently hydrogen, halogen, $C_1$-$C_{20}$ alkyl, $C_2$-$C_{20}$ alkenyl, $C_1$-$C_{20}$ alkylsilyl, $C_1$-$C_{20}$ silylalkyl, $C_1$-$C_{20}$ alkoxysilyl, $C_1$-$C_{20}$ alkoxy, $C_6$-$C_{20}$ aryl, $C_7$-$C_{20}$ alkylaryl, or $C_7$-$C_{20}$ arylalkyl, wherein two or more adjacent groups among $R_{10}$ to $R_{17}$ may be connected together to form substituted or unsubstituted aliphatic or aromatic ring;

$(Cp^1R^a)_n(Cp^2R^b)M^1Z^1{}_{3-n}$     [Chemical Formula 3]

in Chemical Formula 3, $M^1$ is a Group 4 transition metal;

$Cp^1$ and $Cp^2$ are the same as or different from each other, and each independently any one selected from the group consisting of cyclopentadienyl, indenyl, 4,5,6,7-tetrahydro-1-indenyl, and fluorenyl radical, each of which may be substituted by hydrocarbon having 1 to 20 carbon atoms;

$R^a$ and $R^b$ are the same as or different from each other, and each independently hydrogen, $C_1$-$C_{20}$ alkyl, $C_1$-$C_{10}$ alkoxy, $C_2$-$C_{20}$ alkoxyalkyl, $C_6$-$C_{20}$ aryl, $C_6$-$C_{10}$ aryloxy, $C_2$-$C_{20}$ alkenyl, $C_7$-$C_{40}$ alkylaryl, $C_7$-$C_{40}$ arylalkyl, $C_8$-$C_{40}$ arylalkenyl, or $C_2$-$C_{10}$ alkynyl;

$Z^1$ is halogen atom, $C_1$-$C_{20}$ alkyl, $C_2$-$C_{10}$ alkenyl, $C_7$-$C_{40}$ alkylaryl, $C_7$-$C_{40}$ arylalkyl, $C_6$-$C_{20}$ aryl, substituted or unsubstituted $C_1$-$C_{20}$ alkylidene, substituted or unsubstituted amino, $C_2$-$C_{20}$ alkylalkoxy, or $C_7$-$C_{40}$ arylalkoxy; and n is 1 or 0;

$(Cp^3R^c)_mB^1(Cp^4R^d)M^2Z^2{}_{3-m}$     [Chemical Formula 4]

in Chemical Formula 4, $M^2$ is a Group 4 transition metal;

$Cp^3$ and $Cp^4$ are the same as or different from each other, and each independently any one selected from the group consisting of cyclopentadienyl, indenyl, 4,5,6,7-tetrahydro-1-indenyl and fluorenyl radical, each of which may be substituted by hydrocarbon having 1 to 20 carbon atoms;

$R^c$ and $R^d$ are same as or different from each other, and each independently hydrogen, $C_1$-$C_{20}$ alkyl, $C_1$-$C_{10}$ alkoxy, $C_2$-$C_{20}$ alkoxyalkyl, $C_6$-$C_{20}$ aryl, $C_6$-$C_{10}$ aryloxy, $C_2$-$C_{20}$ alkenyl, $C_7$-$C_{40}$ alkylaryl, $C_7$-$C_{40}$ arylalkyl, $C_8$-$C_{40}$ arylalkenyl, or $C_2$-$C_{10}$ alkynyl;

$Z^2$ is halogen atom, $C_1$-$C_{20}$ alkyl, $C_2$-$C_{10}$ alkenyl, $C_7$-$C_{40}$ alkylaryl, $C_7$-$C_{40}$ arylalkyl, $C_6$-$C_{20}$ aryl, substituted or unsubstituted $C_1$-$C_{20}$ alkylidene, substituted or unsubstituted amino group, $C_2$-$C_{20}$ alkylalkoxy, or $C_7$-$C_{40}$ arylalkoxy;

$B^1$ is one or more selected from the radicals containing carbon, germanium, silicon, phosphorous or nitrogen atom, which crosslink $Cp^3R^c$ ring to $Cp^4R^d$ ring, or crosslink one $Cp^4R^d$ ring to $M^2$, or combinations thereof, and m is 1 or 0;

$(Cp^5R^e)B^2(J)M^3Z^3{}_2$     [Chemical Formula 5]

in Chemical Formula 5, $M^3$ is a Group 4 transition metal;

$Cp^5$ is any one selected from the group consisting of cyclopentadienyl, indenyl, 4,5,6,7-tetrahydro-1-indenyl and fluorenyl radical, each of which may be substituted by hydrocarbon having 1 to 20 carbon atoms;

$R^e$ is hydrogen, $C_1$-$C_{20}$ alkyl, $C_1$-$C_{10}$ alkoxy, $C_2$-$C_{20}$ alkoxyalkyl, $C_6$-$C_{20}$ aryl, $C_6$-$C_{10}$ aryloxy, $C_2$-$C_{20}$ alkenyl, $C_7$-$C_{40}$ alkylaryl, $C_7$-$C_{40}$ arylalkyl, $C_8$-$C_{40}$ arylalkenyl, or $C_2$-$C_{10}$ alkynyl;

$Z^3$ is halogen atom, $C_1$-$C_{20}$ alkyl, $C_2$-$C_{10}$ alkenyl, $C_7$-$C_{40}$ alkylaryl, $C_7$-$C_{40}$ arylalkyl, $C_6$-$C_{20}$ aryl, substituted or unsubstituted $C_1$-$C_{20}$ alkylidene, substituted or unsubstituted amino, $C_2$-$C_{20}$ alkylalkoxy, or $C_7$-$C_{40}$ arylalkoxy;

$B^2$ is one or more selected from the radicals containing carbon, germanium, silicon, phosphorous or nitrogen atom, which crosslink $Cp^5R^e$ ring to J, or combinations thereof; and J is any one selected from the group consisting of $NR^f$, O, $PR^f$ and S, wherein $R^f$ is $C_1$-$C_{20}$ alkyl, aryl, substituted alkyl or substituted aryl.

\* \* \* \* \*